(12) United States Patent
Stanley et al.

(10) Patent No.: US 12,417,266 B2
(45) Date of Patent: Sep. 16, 2025

(54) COLLABORATIVE VERIFIED USER PLATFORM USING DISTRIBUTED LEDGER TECHNOLOGY

(71) Applicant: Bank of America Corporation, Charlotte, NC (US)

(72) Inventors: Julie Stanley, Indian Land, SC (US); Benjamin Tweel, Romeoville, IL (US); Basil C. Doyle, Chicago, IL (US); Anna Burchman, Staten Island, NY (US); Jack Franklin Price, Jr., McKinney, TX (US)

(73) Assignee: Bank of America Corporation, Charlotte, NC (US)

( * ) Notice: Subject to any disclaimer, the term of this patent is extended or adjusted under 35 U.S.C. 154(b) by 115 days.

(21) Appl. No.: 18/367,720

(22) Filed: Sep. 13, 2023

(65) Prior Publication Data

US 2025/0086258 A1  Mar. 13, 2025

(51) Int. Cl.
*G06F 21/31* (2013.01)
*G06F 21/45* (2013.01)
*G06F 21/64* (2013.01)

(52) U.S. Cl.
CPC .............. *G06F 21/31* (2013.01); *G06F 21/45* (2013.01); *G06F 21/64* (2013.01)

(58) Field of Classification Search
CPC ........... G06F 21/31; G06F 21/45; G06F 21/64
See application file for complete search history.

(56) References Cited

U.S. PATENT DOCUMENTS

| | | | | |
|---|---|---|---|---|
| 4,887,206 A | * | 12/1989 | Natarajan | G06Q 30/0283 706/904 |
| 10,915,874 B2 | * | 2/2021 | Code | H04L 63/0861 |
| 11,139,955 B1 | * | 10/2021 | So | G06Q 20/3674 |
| 11,556,991 B1 | | 1/2023 | Maeng et al. | |
| 11,636,520 B1 | | 4/2023 | Olden | |
| 11,664,099 B1 | | 5/2023 | Jain et al. | |
| 11,669,423 B2 | | 6/2023 | Meeran et al. | |
| 11,669,544 B2 | | 6/2023 | Goldberg et al. | |
| 11,669,914 B2 | | 6/2023 | Cella | |
| 11,670,275 B2 | | 6/2023 | Muggleton et al. | |
| 2002/0103731 A1 | * | 8/2002 | Barnard | G06Q 10/063112 705/34 |
| 2007/0162339 A1 | | 7/2007 | Arning et al. | |

(Continued)

*Primary Examiner* — Dao Q Ho
(74) *Attorney, Agent, or Firm* — Banner & Witcoff, Ltd.

(57) ABSTRACT

Aspects of the disclosure relate to a collaborative verified user platform using distributed ledger technology. A collaborative verified user platform may receive user information from a first user device. The platform may store the user information to a distributed ledger. The platform may update the distributed ledger based on one or more changes to the user information. The platform may receive a request to access the user information. The platform may determine whether to grant access to the user information based on one or more permissions. The platform may establish a secure channel between a first user device and a second user device. The platform may process secure requests associated with a venture corresponding to both the first user device and to the second user device. The platform may detect a permission violation. The platform may initiate one or more security actions based on the permission violation.

20 Claims, 15 Drawing Sheets

(56) References Cited

U.S. PATENT DOCUMENTS

| | | | |
|---|---|---|---|
| 2009/0254572 A1 | 10/2009 | Redlich et al. | |
| 2015/0040244 A1 | 2/2015 | DeBenedictis et al. | |
| 2020/0111104 A1* | 4/2020 | George | G06F 16/113 |
| 2020/0311101 A1* | 10/2020 | Snitzer | G06F 21/64 |
| 2020/0327458 A1* | 10/2020 | Dutt | G06Q 20/321 |
| 2022/0084013 A1* | 3/2022 | Kulkarni | G06Q 20/3825 |
| 2022/0360450 A1 | 11/2022 | Brandenburger et al. | |
| 2022/0366406 A1* | 11/2022 | Perez | G06F 16/27 |
| 2022/0366494 A1 | 11/2022 | Cella et al. | |
| 2022/0383282 A1 | 12/2022 | Apollo et al. | |
| 2022/0398340 A1* | 12/2022 | Jakobsson | G06F 21/6245 |
| 2022/0398538 A1 | 12/2022 | Jakobsson et al. | |
| 2022/0398666 A1 | 12/2022 | Apollo et al. | |
| 2023/0010495 A1 | 1/2023 | Bronstein | |
| 2023/0019921 A1 | 1/2023 | Castinado et al. | |
| 2023/0020193 A1 | 1/2023 | Williams et al. | |
| 2023/0156010 A1 | 5/2023 | Sarkar et al. | |
| 2023/0156155 A1 | 5/2023 | Zhang | |
| 2023/0168875 A1 | 6/2023 | Carter | |
| 2023/0169356 A1 | 6/2023 | Banerjee et al. | |
| 2023/0169492 A1* | 6/2023 | Khalfan | G06Q 20/4014 705/44 |
| 2023/0205833 A1 | 6/2023 | Saha et al. | |
| 2023/0274287 A1* | 8/2023 | Blaikie, III | H04L 9/3239 705/50 |

\* cited by examiner

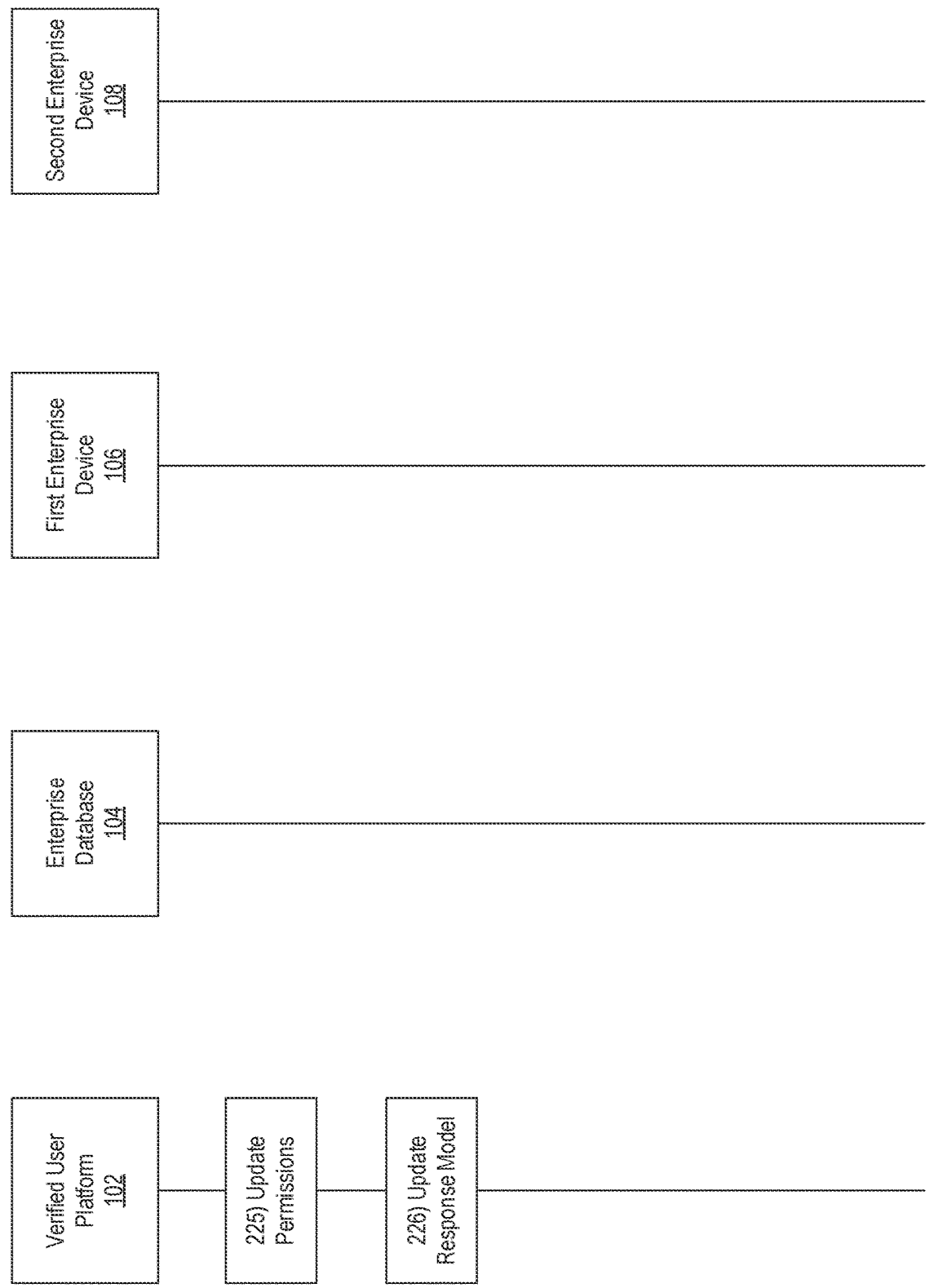

Access Alert Interface

300

Notification: User Information Requested
Requested Information: User Information Portion 1
Requesting Device: Enterprise Device 2
Access Determination: Permissions Grant Access Confirm Access?

Thumbprint

COLLABORATIVE VERIFIED USER PLATFORM USING DISTRIBUTED LEDGER TECHNOLOGY

BACKGROUND

Aspects described herein are related to enabling and controlling communication between devices associated with different entities. In some instances, a system corresponding to a first entity (e.g., an enterprise organization, such as a financial institution, and/or other institutions) may store user information including information related to a plurality of users associated with the first entity and having particular user characteristics, such as attributes and/or knowledge (e.g., skills specifically related to the enterprise organization's ventures, work experience, communication skills, user preferences, and/or other user characteristics). In some examples, one or more additional entities (which may, e.g., be associated with a same venture and/or organizational venture as the first entity) may benefit from the ability to access some or all of this user information. However, in some examples, a portion of the user information may be confidential and/or belong to the enterprise organization. Additionally, in some examples, employees/users associated with the first entity might not be able to directly communicate with one or more of the additional entities. For example, there may be technical issues that prevent and/or impair collaboration between devices managed by the first entity with devices managed by one or more additional entities. For instance, differences in configurations such as operating systems, compatibility requirements, handshake methods, and/or other factors may prevent the first entity's devices from communicating with devices managed by one or more additional entities. Accordingly, it may be important to provide a secure method by which multiple associated entities, with devices which may have different configurations, may collaborate to share limited portions of user information to accomplish one or more mutual goals.

SUMMARY

Aspects of the disclosure provide effective, efficient, scalable, and convenient technical solutions that address and overcome the technical problems associated with current methods of sharing information related to investigations of impact events. In accordance with one or more arrangements of the disclosure, a computing platform with at least one processor, a communication interface, and memory storing computer-readable instructions may receive user information corresponding to a first user from a first user device. The computing platform may store the user information at a distributed ledger maintained by the computing platform. The computing platform may identify one or more changes to the user information based on a correlation included in the user information and to a user profile at a remote database. The computing platform may update the distributed ledger based on retrieving the one or more changes from the remote database. Updating the distributed ledger may include adding or modifying an entry corresponding to the first user at the distributed ledger. The computing platform may receive a request to access the user information corresponding to the first user from a second user device. The computing platform may determine whether the second user device has access to the user information based on one or more permissions included in the user information. The computing platform may send an authorized access alert to the first user device based on determining the second user device has access to the user information. The computing platform may establish a secure channel between the first user device and the second user device via the computing platform based on receiving approval information confirming access to the user information from the first user device. The computing platform may process one or more secure requests associated with a venture corresponding to both the first user device and to the second user device based on communications sent via the secure channel. The computing platform may detect a permission violation while processing the one or more secure requests. The computing platform may initiate one or more security actions based on the permission violation.

In one or more arrangements, the computing platform may train a response model based on historical cyber contracts associated with the first user. Training the response model may configure the response model to output proposed security actions based on information indicating permission violations. The computing platform may generate one or more proposed security actions based on inputting information of the detected permission violation into the response model. The one or more security actions initiated by the computing platform may include at least one of the one or more proposed security actions. The computing platform may receive one or more updated cyber contracts from the first user device and based on initiating the one or more security actions. The computing platform may update the response model based on one or more updated cyber contracts.

In one or more examples, the computing platform may receive an updated cyber contract corresponding to the user information from the first user device. The computing platform may update one or more permissions associated with accessing the user information based on the updated cyber contract.

In one or more arrangements, processing the one or more secure requests may include receiving, from the first user device, an incident report comprising information corresponding to one or more of: a financial event impacting the venture corresponding to both the first user device and to the second user device, an environmental event impacting the venture corresponding to both the first user device and to the second user device, a risk event impacting the venture corresponding to both the first user device and to the second user device, or a regulatory event impacting the venture corresponding to both the first user device and to the second user device. Processing the one or more secure requests may include providing the incident report to the second user device via the secure channel. Processing the one or more secure requests may include causing the second user device to initiate one or more response actions based on providing the incident report to the second user device. Processing the one or more secure requests may include updating the incident report based on the one or more response actions. Updating the incident report may include adding or modifying an entry corresponding to the incident report at the distributed ledger.

In one or more examples, processing the one or more secure requests may include receiving an interaction opportunity from the first user device. The interaction opportunity may include one or more of: an employment opportunity, a request to communicate with a user associated with the venture corresponding to both the first user device and to the second user device, or an invitation to collaborate on a project associated with the venture corresponding to both the first user device and to the second user device. Processing the one or more secure requests may include providing the interaction opportunity to the second user device via the secure channel. Processing the one or more secure requests may include receiving a response to the interaction opportunity based on providing the interaction opportunity to the second user device and from the second user device. Processing the one or more secure requests may include providing the response to the interaction opportunity to the first user device. Processing the one or more secure requests may include hosting a discussion between the first user and a second user of the second user device based on the response to the interaction opportunity and via the secure channel.

In one or more examples, the one or more security actions may include one or more of: terminating the secure channel, filtering one or more messages sent via the secure channel, denying the second user device access to a requested portion of the user information, or storing a record of the permission violation, wherein storing the record of the permission violation comprises modifying or adding an entry to the distributed ledger, wherein the entry comprises an indication of the permission violation and a corresponding indication of the second user device. In one or more arrangements, the one or more permissions may include one or more rules included in a cyber contract associated with the first user. In one or more examples, the one or more permissions may include a private/public key pair. In one or more arrangements, determining whether the second user device has access to the user information may include notifying the first user device of an access attempt based on receiving the request to access the user information. The notifying may include sending an indication of the second user device and an indication of a requested portion of the user information. Determining whether the second user device has access to the user information may include requesting biometric information of the first user from the first user device and based on notifying the first user device of the access attempt. Determining whether the second user device has access to the user information may include receiving the biometric information of the first user from the first user device. Determining whether the second user device has access to the user information may include granting the second user device access to the user information based on receiving the biometric information of the first user.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2G depict an illustrative event sequence for a collaborative verified user platform using distributed ledger technology in accordance with one or more example arrangements;

DETAILED DESCRIPTION

Figure 1A:
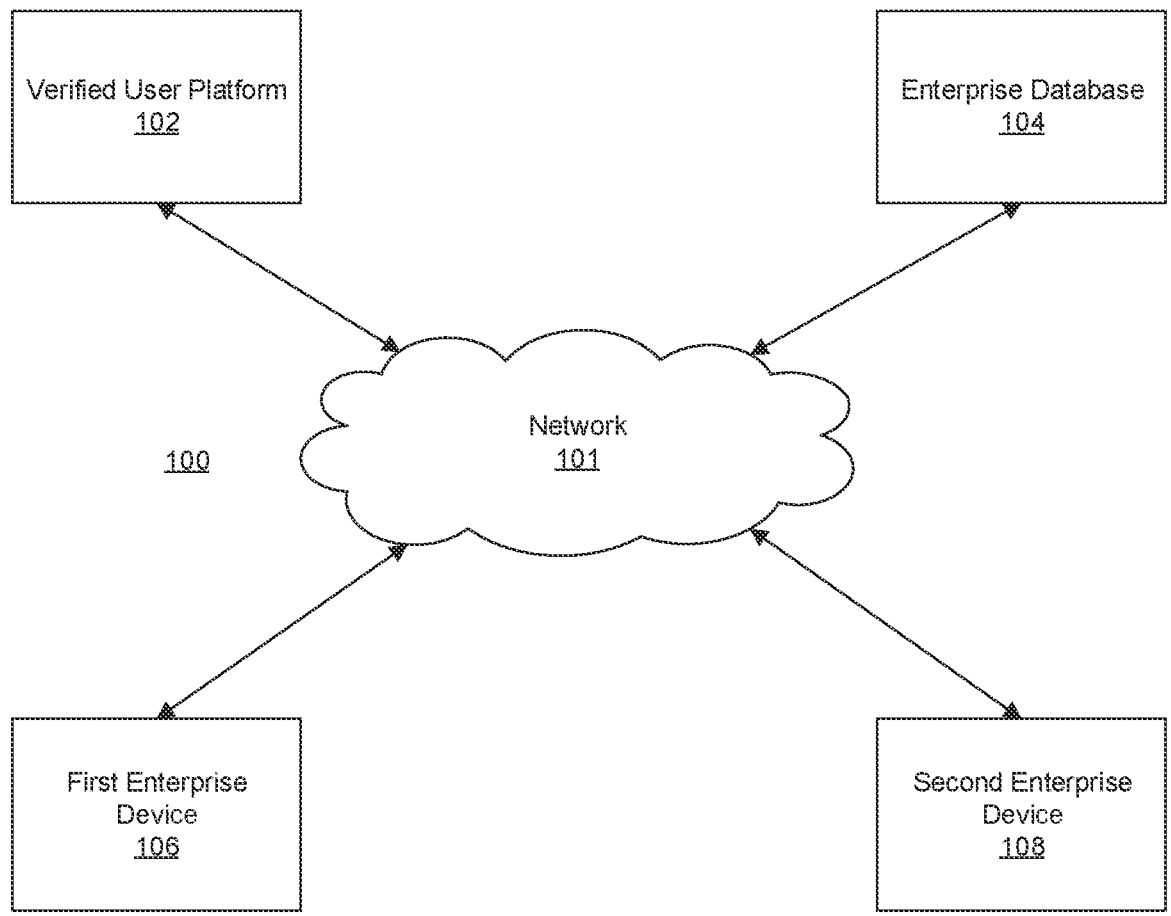
FIGS. 1A-1B depict an illustrative computing environment for a collaborative verified user platform using distributed ledger technology in accordance with one or more example arrangements.

In the following description of various illustrative arrangements, reference is made to the accompanying drawings, which form a part hereof, and in which is shown, by way of illustration, various arrangements in which aspects of the disclosure may be practiced. In some instances, other arrangements may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief description of the concepts described further herein, some aspects of the disclosure relate to a collaborative verified user platform using distributed ledger technology. A first user (e.g., an employee, and/or other users) associated with a first entity (e.g., an enterprise organization, such as a financial institution, and/or other institutions) may be associated with user information including user characteristics that include certain attributes and/or knowledge of the first user. For example, the first user's user information may include personal attributes (e.g., work experience, certifications, skills, preferences, and/or other attributes) and/or knowledge (e.g., knowledge of incidents that might affect a venture pursued by the enterprise organization, knowledge of opportunities associated with the enterprise organization, and/or other knowledge). In some instances, some or all of this user information may be valuable to similar users associated with additional entities (e.g., additional enterprise organizations, such as financial institutions and/or other institutions) that are pursuing one or more of the same ventures as the first entity. Accordingly, it may be beneficial for the one or more entities to have access to the user information of the first user.

However, in some examples, the first user might not be able to, or might not wish to, share a portion of their user information with users associated with the additional entities. For example, the first entity may be an enterprise organization (e.g., a financial institution, and/or other institutions) that may have confidential information the first user can access, but which the first entity does not want shared. Additionally or alternatively, the first entity may maintain a user profile of user information corresponding to the first user, some or all of which the first user might not want to share with other entities. In some examples, one or more regulations and/or policies may additionally prevent direct transfers of information and/or communications between users associated with different entities pursuing the same venture.

Accordingly, a collaborative verified user platform may be employed by multiple entities associated with the same organizational venture to provide the secure method of sharing information via computing devices as described above. In some instances, the collaborative verified user platform may maintain a decentralized distributed ledger that stores user information from various users. The users may provide the user information to the collaborative verified user platform based on one or more cybersecurity contracts that provide permissions (e.g., permissions from the users and/or permissions from the enterprise organization associated with each user) that control access to the information. Using the decentralized collaborative verified user platform, a second user associated with a second enterprise organization may request a portion of the user information of a first user associated with a first enterprise organization (e.g., to identify the first user as someone the second user desires to discuss an incident with, to identify the first user as someone the second user desires to discuss an interaction opportunity with, and/or for other purposes). The collaborative verified user platform may determine whether to grant access based on the permissions and/or based on receiving biometric authorization from the first user. Based on determining that the second user should be granted permission to the requested information, the collaborative verified user platform may establish a secure channel between the first user and the second user (e.g., via user devices corresponding to each user) to allow for the transfer of the requested information and/or to facilitate real-time communications between the first user and the second user. While the secure channel is established, the first user and/or the second user may utilize the collaborative verified user platform to process one or more requests related to the user information stored by the platform (e.g., requests to receive and respond to an incident report, requests to receive and respond to an interaction opportunity, and/or other requests).

To ensure the security of the information stored at the collaborative verified user platform, the platform may continuously monitor the secure channel while it is established to identify any potential permissions violations that may occur after initially granting the second user access to the requested information. For example, the second user may have initially requested a first portion of information, but may request a second portion that the second user is not authorized to access while the secure channel is established. In these examples, the collaborative verified user platform may initiate one or more security actions (e.g., terminating the secure channel, filtering one or more messages sent via the secure channel, denying the second user access to a requested portion of the user information, storing a record of the permission violation, and/or other security actions) to prevent any unauthorized access of sensitive information included in the user information. In some examples, the collaborative verified user platform may implement one or more machine learning models to assist with detecting and responding to permissions violations. For instance, the collaborative verified user platform may implement a response model trained to propose security actions based on detecting a permissions violation.

These and various other aspects will be discussed more fully herein.

Figure 1B:
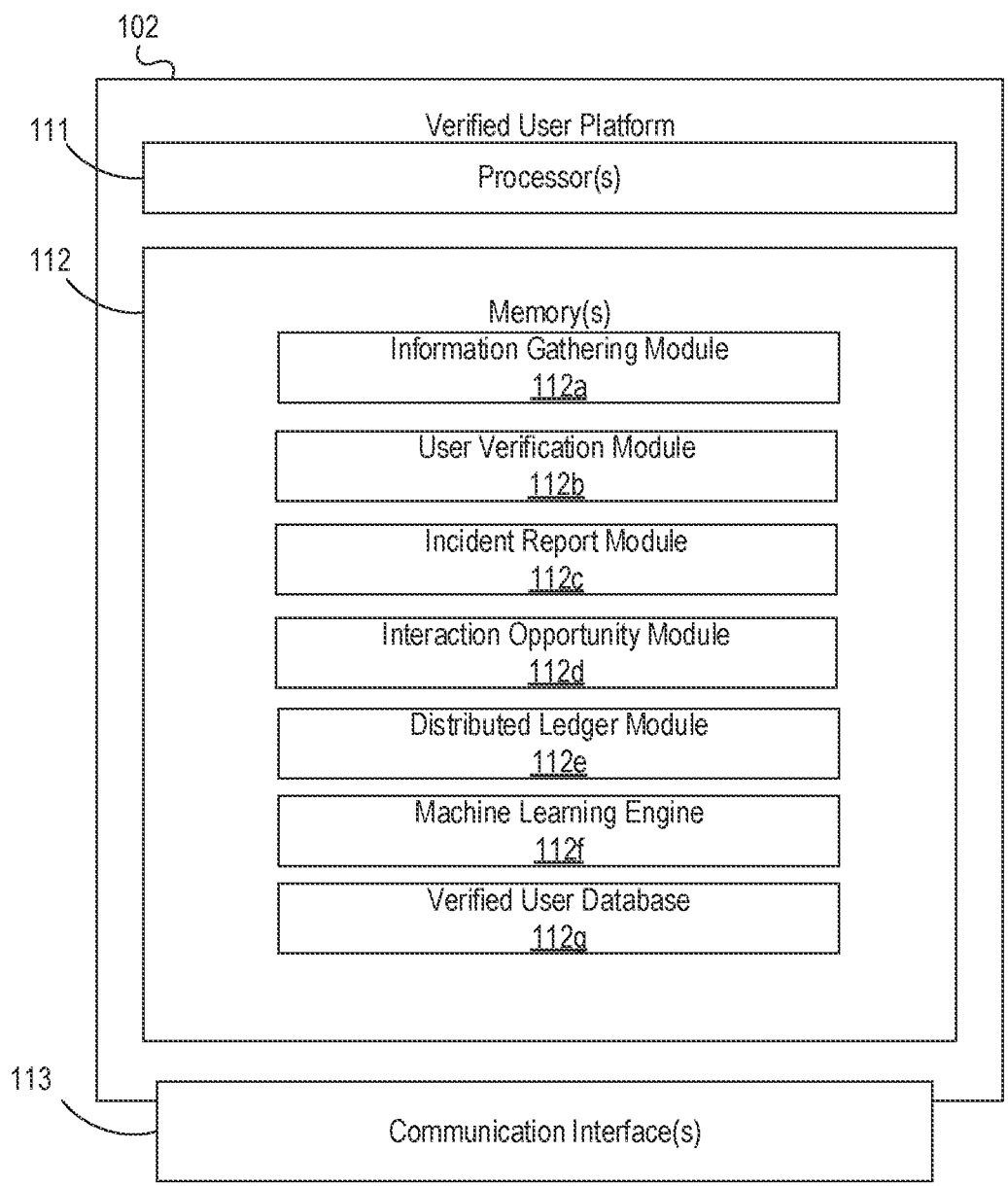

FIGS. 1A-1B depict an illustrative computing environment for a collaborative verified user platform using distributed ledger technology in accordance with one or more example arrangements. Referring to FIG. 1A, computing environment 100 may include one or more computer systems. For example, computing environment 100 may include verified user platform 102, an enterprise database 104, a first enterprise device 106, and a second enterprise device 108.

As described further below, verified user platform 102 may be a computer system that includes one or more computing devices (e.g., servers, laptop computer, desktop computer, mobile device, tablet, smartphone, and/or other devices) and/or other computer components (e.g., processors, memories, communication interfaces) that may be used to host a distributed ledger and maintain a collaborative verified user system. For example, the verified user platform 102 may be configured to receive user information and requests from one or more computing device (e.g., enterprise database 104, first enterprise device 106, second enterprise device 108, and/or other computing device). In some examples, the verified user platform 102 may be further configured to host, maintain, and/or otherwise access a distributed ledger to store and/or validate the user information. In some instances, the verified user platform 102 may be maintained and/or otherwise accessed by a plurality of organizations (e.g., rather than a single organization). In one or more instances, the verified user platform 102 may be configured to communicate with one or more systems (e.g., enterprise database 104, first enterprise device 106, second enterprise device 108, and/or other systems) to perform an information transfer, display an interface, grant access to the user information at the distributed ledger, establish a secure communications channel, and/or perform other functions. In some instances, the one or more computing devices and/or other computer components may be used to configure, train, and/or execute one or more machine learning models (e.g., a response model, and/or other models). For example, the verified user platform 102 may train the one or more machine learning models to generate proposed security actions in response to input of information indicating a permissions violation.

The enterprise database 104 may be and/or otherwise include one or more computing devices (e.g., servers, server blades, and/or other devices) and/or other computer components (e.g., processors, memories, communication interfaces) that may be used to create, host, modify, and/or otherwise validate an organized collection of information (e.g., a user profile database). The enterprise database 104 may be synchronized across multiple nodes (e.g., sites, institutions, geographical locations, and/or other nodes) and may be accessible by multiple users (who may, e.g., be employees of an enterprise organization such as a financial institutions). The information stored at the enterprise database 104 may include information corresponding to employees of the enterprise organization (e.g., user characteristics/ personal attributes (e.g., work experience, certifications, skills, preferences, and/or other attributes), knowledge (e.g., knowledge of incidents that might affect a venture pursued by the enterprise organization, knowledge of opportunities associated with the enterprise organization, and/or other knowledge), and/or other information) and/or other information. In some instances, the enterprise database 104 may be accessed by, validated by, and/or modified by any of, verified user platform 102, first enterprise device 106, and/or other devices. Although shown as an independent, remote database, in some instances, the enterprise database 104 may be part of and/or otherwise integrated into the verified user platform 102 without departing from the scope of the disclosure.

The first enterprise device 106 may be a computing device (e.g., laptop computer, desktop computer, mobile device, tablet, smartphone, server, server blade, and/or other device) and/or other data storing or computing component (e.g., processors, memories, communication interfaces, databases) that may be used to transfer information between devices and/or perform other user functions (e.g., sending user information, sending interaction opportunities, sending incident reports, and/or other functions). In one or more instances, first enterprise device 106 may correspond to a first entity (e.g., an enterprise organization, such as a financial institution and/or other institution). In one or more examples, the first entity may be involved in and/or associated with an organizational venture (e.g., a public health organizational venture, a financial organizational venture, a political organizational venture, a charitable organizational venture, an international organizational venture, and/or other organizational ventures). In one or more instances, the first enterprise device 106 may be configured to communicate with one or more systems (e.g., verified user platform 102, enterprise database 104, second enterprise device 108, and/ or other systems) to perform a data transfer, and/or to perform other functions. In some instances, the first enterprise device 106 may be configured to display one or more graphical user interfaces (e.g., access alert interfaces, and/or other interfaces).

The second enterprise device 108 may be a computing device (e.g., laptop computer, desktop computer, mobile device, tablet, smartphone, server, server blade, and/or other device) and/or other data storing or computing component (e.g., processors, memories, communication interfaces, databases) that may be used to transfer information between devices and/or perform other user functions (e.g., requesting user information, providing responses to incident reports and/or interaction opportunities, and/or other functions). In one or more instances, second enterprise device 108 may correspond to a second entity (e.g., an enterprise organization, such as a financial institution and/or other institution) different from the first entity. In one or more examples, the second entity may be involved in and/or associated with an organizational venture (e.g., a public health organizational venture, a financial organizational venture, a political organizational venture, a charitable organizational venture, an international organizational venture, and/or other organizational ventures). In some examples, the second entity may be involved in and/or associated with the same organizational venture as the first entity corresponding to first enterprise device 106. In one or more instances, the second enterprise device 108 may be configured to communicate with one or more systems (e.g., verified user platform 102, first enterprise device 106, and/or other systems) to perform a data transfer, request user information, and/or to perform other functions. In some instances, the second enterprise device 108 may be configured to display one or more graphical user interfaces (e.g., access alert interfaces, and/or other interfaces).

Although only two user/enterprise devices are depicted herein, any number of such systems may be used to implement the methods described herein without departing from the scope of the disclosure.

Computing environment 100 also may include one or more networks, which may interconnect verified user platform 102, enterprise database 104, first enterprise device 106, and second enterprise device 108. For example, computing environment 100 may include a network 101 (which may interconnect, e.g., verified user platform 102, enterprise database 104, first enterprise device 106, and second enterprise device 108).

In one or more arrangements, verified user platform 102, enterprise database 104, first enterprise device 106, and second enterprise device 108 may be any type of computing device capable of sending and/or receiving requests and processing the requests accordingly. For example, verified user platform 102, enterprise database 104, first enterprise device 106, and second enterprise device 108, and/or the other systems included in computing environment 100 may, in some instances, be and/or include server computers, desktop computers, laptop computers, tablet computers, or the like that may include one or more processors, memories, communication interfaces, storage devices, and/or other components. As noted above, and as illustrated in greater detail below, any and/or all of verified user platform 102, enterprise database 104, first enterprise device 106, and second enterprise device 108, may, in some instances, be special-purpose computing devices configured to perform specific functions.

Referring to FIG. 1B, verified user platform 102 may include one or more processors 111, memory 112, and communication interface 113. A data bus may interconnect processor 111, memory 112, and communication interface 113. Communication interface 113 may be a network interface configured to support communication between verified user platform 102 and one or more networks (e.g., network 101, or the like). Communication interface 113 may be communicatively coupled to the processor 111. Memory 112 may include one or more program modules having instructions that, when executed by processor 111, cause verified user platform 102 to perform one or more functions described herein and/or one or more databases (e.g., a verified user database 112h, or the like) that may store and/or otherwise maintain information which may be used by such program modules and/or processor 111. In some instances, the one or more program modules and/or databases may be stored by and/or maintained in different memory units of verified user platform 102 and/or by different computing devices that may form and/or otherwise make up verified user platform 102. For example, memory 112 may have, host, store, and/or include an information gathering module 112a, a user verification module 112b, an incident report module 112c, an interaction opportunity module 112d, a distributed ledger module 112e, a machine learning engine 112f, a verified user database 112g and/or other modules and/or databases.

Information gathering module 112a may have instructions that direct and/or cause verified user platform 102 to receive user information, identify changes in user information, update user information, and/or perform other functions. User verification module 112b may have instructions that direct and/or cause verified user platform 102 to determine whether a user device has access to requested user information, receive biometric authorizations, and/or perform other functions. Incident report module 112c may have instructions that direct and/or cause verified user platform 102 to receive incident reports, provide incident reports to user devices, update incident reports, and/or perform other functions. Interaction opportunity module 112d may have instructions that direct and/or cause verified user platform 102 to send/receive interaction opportunities, send/receive responses to interaction opportunities, store interaction opportunities, and/or perform other functions. Distributed ledger module 112e may be used to generate, maintain, and/or otherwise access a distributed ledger for user information storage and/or validation. Machine learning engine 112f may contain instructions directing and/or causing the verified user platform 102 to train, implement, and/or update one or more machine learning models, such as a response model (that may, e.g., be used to generate proposed security actions), and/or other models. In some instances, machine learning engine 112f may be used by verified user platform 102 to refine and/or otherwise update methods for using a collaborative verified user platform, and/or other methods described herein. Verified user database 112g may have instructions causing verified user platform 102 to store user information, incident reports, interaction opportunities, and/or other information (e.g., by adding and/or modifying entries in a distributed ledger managed by distributed ledger module 112e).

Although information gathering module 112a, user verification module 112b, incident report module 112c, interaction opportunity module 112d, distributed ledger module 112e, machine learning engine 112f, and verified user database 112g are depicted as separate modules herein, the instructions stored by these modules may be stored in any number of modules without departing from the scope of this disclosure.

Figure 2A:
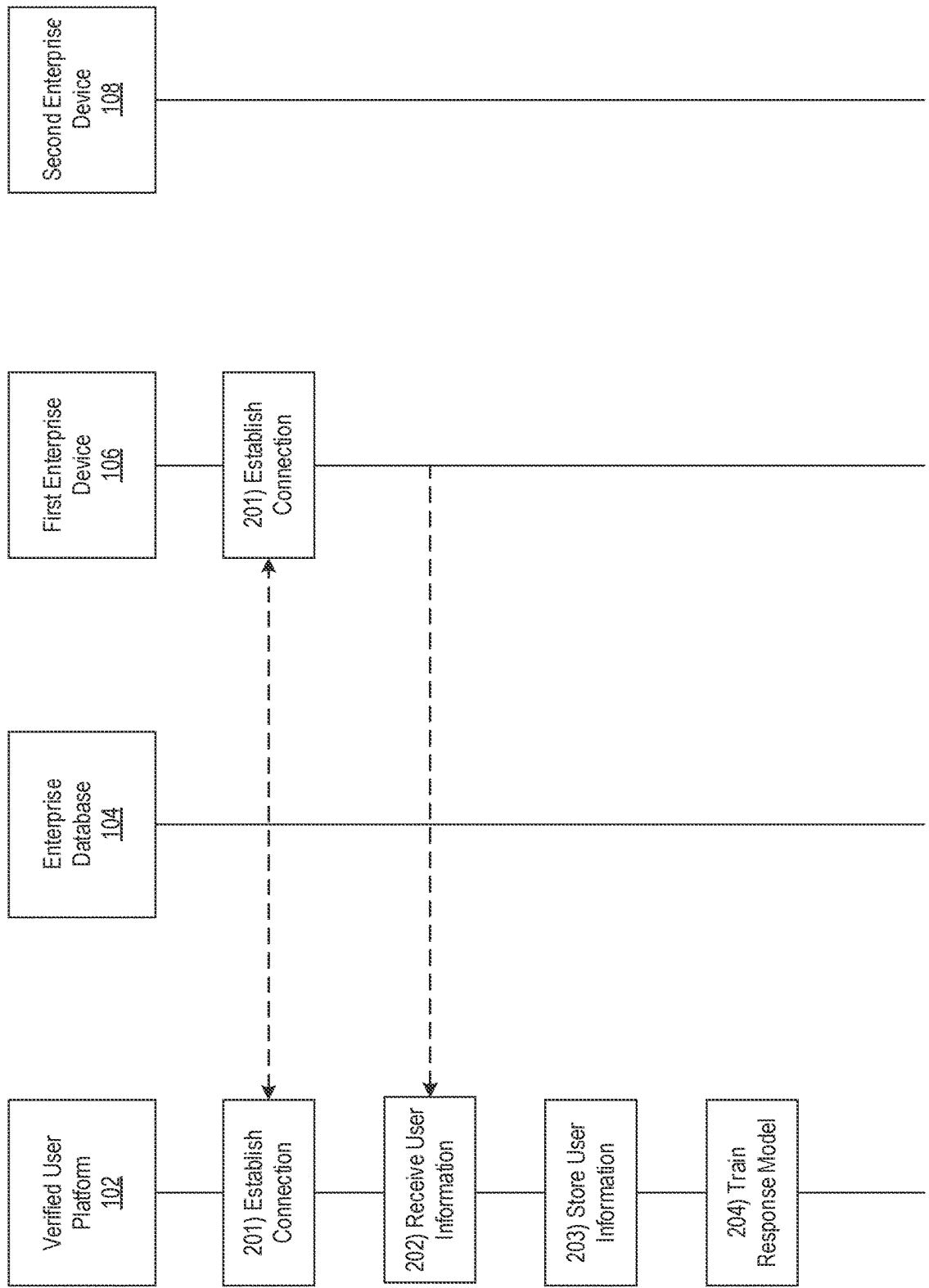

FIGS. 2A-2G depict an illustrative event sequence for a collaborative verified user platform using distributed ledger technology in accordance with one or more example arrangements. Referring to FIG. 2A, at step 201, the verified user platform 102 may establish a connection with the first enterprise device 106. For example, the verified user platform 102 may establish a first wireless data connection with the first enterprise device 106 to link the first enterprise device 106 with the verified user platform 102 (e.g., in preparation for receiving user information, sending access alerts, receiving biometric authorization information, and/or other functions). In some instances, the verified user platform 102 may identify whether or not a connection is already established with the first enterprise device 106. If a connection is already established with the first enterprise device 106, the verified user platform 102 might not re-establish the connection. If a connection is not yet established with the first enterprise device 106, the verified user platform 102 may establish the first wireless data connection as described above.

At step 202, the verified user platform 102 may receive user information from an enterprise device. For instances, the verified user platform 102 may receive the user information from first enterprise device 106 (e.g., via the communication interface 113 and while the first wireless data connection is established). For example, the verified user platform 102 may receive user information corresponding to the user of first enterprise device 106. In some instances, the user information may include user characteristics/personal attributes (e.g., work experience, certifications, skills, preferences, and/or other attributes). Additionally or alternatively, in some examples the user information may include information representing knowledge such as knowledge of incidents that might affect a venture pursued by the enterprise organization (e.g., a financial event impacting the venture and/or the enterprise organization, an environmental event impacting the venture and/or the enterprise organization, a risk event impacting the venture and/or the enterprise organization, a regulatory event impacting the venture and/or the enterprise organization, and/or other incidents), knowledge of interaction opportunities associated with the enterprise organization (e.g., employment opportunities, opportunities to communicate with the user, invitations to collaborate on mutual projects, and/or other interaction opportunities), and/or other knowledge. In some examples, the user information may additionally include a correlation (e.g., a digital signature, link and/or other correlations) associating the user information with a user profile. For instance, the user information may include a correlation associating the user information with a user profile for the user of first enterprise device 106 that may, e.g., be stored and/or otherwise maintained by the enterprise database 104.

Additionally or alternatively, in some instances, the user information may further include one or more permissions and/or rules for accessing the user information. For example, the user information may include one or more cyber contracts (e.g., smart cyber contracts, or the like) with code defining rules for accessing the user information. In some instances, the one or more cyber contracts may include cyber contracts generated by a user (e.g., the user of first enterprise device 106, and/or other users). In these instances, the cyber contracts generated by the user may define rules for accessing personal information for which the user is the sole owner and/or personal information that is authorized for public use by the enterprise organization (e.g., personal demographic information, personal contact information, work experience, certification, skills, user preferences, and/or other personal information). Additionally or alternatively, in some examples, the one or more cyber contracts may include cyber contracts generated by an enterprise organization (e.g., the venture associated with the first enterprise device 106, and/or other enterprises). In these examples, the cyber contracts generated by the enterprise organization may define rules for accessing information in the possession of the user but which is owned by the enterprise organization (e.g., employee records, records associated with ventures pursued by the enterprise organization, incident reports of incidents affecting a venture and/or the enterprise organization, and/or other information). Additionally or alternatively, the user information may include a private/public key pairing associated with the user. For example, the user information may include a private key and a public key generated with cryptographic algorithms. The public key may encrypt the user information such that only a user and/or user device in possession of the private key may decrypt the user information. In some examples, the verified user platform 102 may receive additional user information corresponding to additional users from additional enterprise devices (e.g., second enterprise device 108, and/or other additional enterprise devices) without departing from the scope of this disclosure.

At step 203, the verified user platform 102 may store the user information. For example, based on receiving the user information from first enterprise device 106, the verified user platform 102 may store the user information to the distributed ledger. For instance, the verified user platform 102 may modify the distributed ledger by adding a new entry corresponding to the user information, modifying an existing entry to include the user information, and/or otherwise incorporating the user information into the distributed ledger. In some instances, the distributed ledger may include one or more sets of historical user information. For example, the verified user platform 102 may have previously received the one or more sets of historical user information from one or more additional enterprise devices (e.g., second enterprise device 108, and/or other enterprise devices) and stored them to the distributed ledger. In these examples, the one or more sets of historical user information may have been received from the same user at a period of time where the user was employed by a different entity (e.g., the enterprise organization associated with second enterprise device 108, and/or other entities). In these instances, the verified user platform 102 may store the user information by modifying an entry of the distributed ledger including at least one set of historical user information to include the user information received from first enterprise device 106 at step 202 as well.

At step 204, the verified user platform 102 may train a response model. In some instances, the verified user platform 102 may configure and/or otherwise train the response model to generate proposed security actions based on historical cyber contracts (which may, e.g., have been included in the sets of historical user information stored in the distributed ledger, as described above at step 203). In some instances, to configure and/or otherwise train the response model, the verified user platform 102 may process one or more historical cyber contracts by applying natural language processing, natural language understanding, supervised machine learning techniques (e.g., regression, classification, neural networks, support vector machines, random forest models, naïve Bayesian models, and/or other supervised techniques), unsupervised machine learning techniques (e.g., principal component analysis, hierarchical clustering, K-means clustering, and/or other unsupervised techniques), and/or other techniques. In doing so, the verified user platform 102 may train the response model to generate proposed security actions based on input of information indicating permission violations.

For example, in configuring and/or otherwise training the response model, the verified user platform 102 may identify one or more permissions and/or rules included in the historical cyber contracts. For instance, the verified user platform 102 may, based on historical cyber contracts, identify one or more permissions and/or rules that control access to the user information received at step 202. In these instances, the historical cyber contracts may be and/or include one or more cyber contracts included in the user information received at step 202. Additionally or alternatively, in some examples, the historical cyber contracts may be and/or include one or more cyber contracts included in historical user information received by the verified user platform 102 that are associated with the same user (e.g., the user of first enterprise device 106, and/or other users) who provided the user information at step 202. In some instances, the verified user platform 102 may, based on identifying the one or more permissions and/or rules from the historical cyber contracts, train the response model to generate proposed security actions based on the one or more permissions and/or rules. For example, the verified user platform 102 may train the response model to generate proposed security actions that prevent and/or cut off access to the user information when the verified user platform 102 detects that one or more permissions and/or rules have been violated.

Consider an example where the historical cyber contracts include one or more permissions indicating that a first portion of the user information, such as the user's employment history, may be accessed by any enterprise device associated with the verified user platform 102. In this example, the historical cyber contracts may additionally include one or more permissions indicating that a second portion of the user information, such as the user's contact information (e.g., email, phone number, or the like) may be accessed only by an enterprise device possessing a private key for decrypting the second portion of the user information. Based on identifying the above-described permissions, the verified user platform 102 may train the response model to generate proposed security actions based on the verified user platform 102 inputting information indicating that an enterprise device is attempting to access the second portion of the user information without the private key. For instance, the verified user platform 102 may cause the response model to store a correlation between the second portion of the user information and the private key. Accordingly, the verified user platform 102 may train the response model to recognize whether the private key is included in information inputted by the verified user platform 102 indicating an attempt to access the second portion of the user information has occurred. In these examples, based on input of information indicating a violation of the permissions described above, the verified user platform 102 may generate one or more proposed security actions configured to prevent and/or cut off access to the second portion of the user information (e.g., by terminating a secure channel, filtering one or more message sent via a secure channel, denying the user device requesting the second portion of the user information access, storing a record (e.g., to the distributed ledger) of the permission violation, and/or other proposed security actions). It should be understood the above description merely represents examples of how the response model may be trained to generate proposed security actions, and in one or more additional examples further methods of training the response model may be utilized by the verified user platform 102.

Figure 2B:
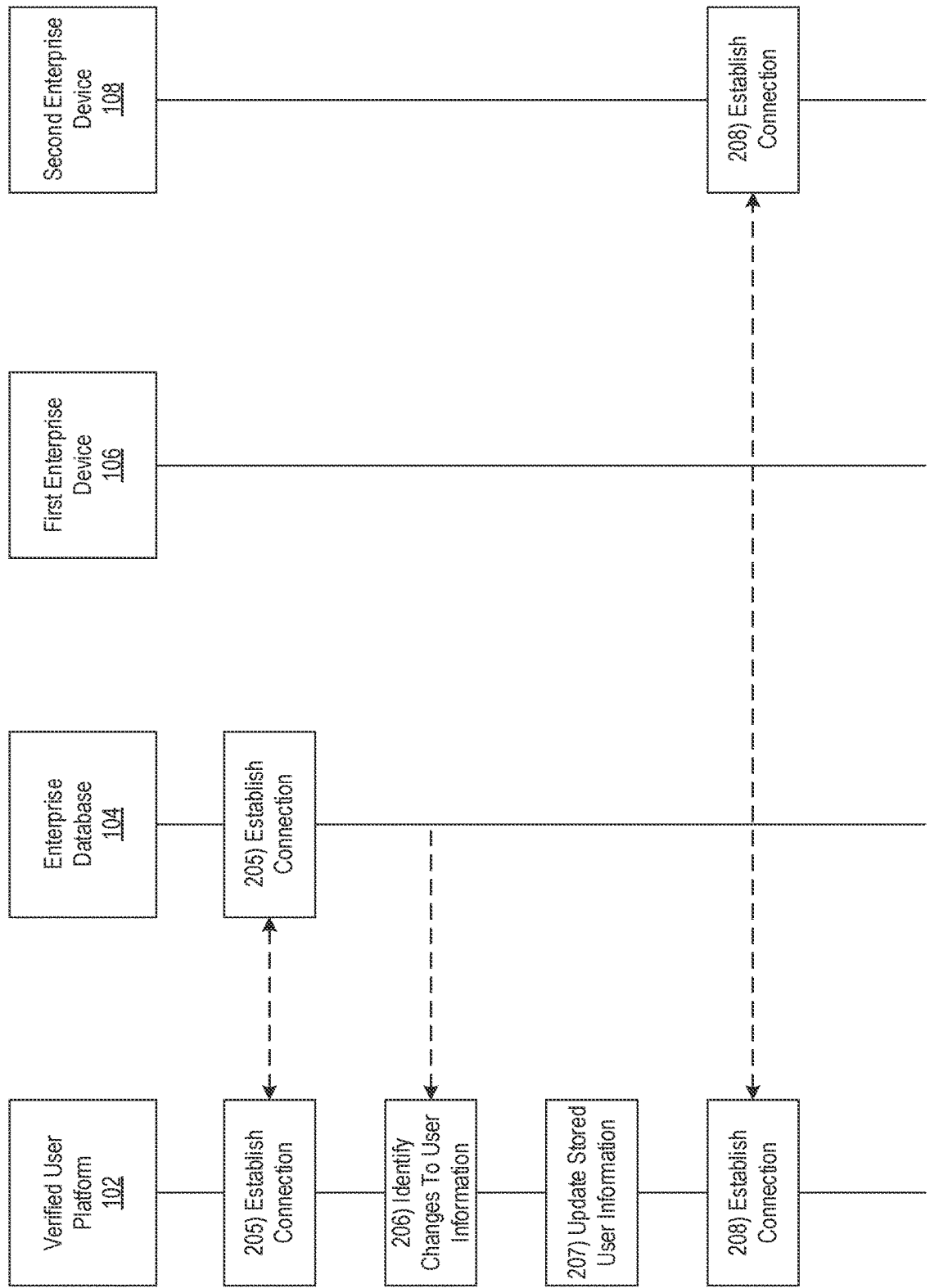

Referring to FIG. 2B, at step 205, the verified user platform 102 may establish a connection with enterprise database 104. For example, verified user platform 102 may establish a second wireless data connection with the enterprise database 104 to link the enterprise database 104 with the verified user platform 102 (e.g., in preparation for transferring information, and/or other functions). In some instances, the verified user platform 102 may identify whether or not a connection is already established with the enterprise database 104. If a connection is already established with the enterprise database 104, the verified user platform 102 might not re-establish the connection. If a connection is not yet established with the enterprise database 104, the verified user platform 102 may establish the second wireless data connection as described above.

At step 206, the verified user platform 102 may identify whether there are any changes and/or updates to the user information received at step 202. In identifying whether there are any changes and/or updates, the verified user platform 102 may parse, mine, and/or otherwise analyze a user profile stored at the enterprise database 104 (e.g., via the communication interface 113 and while the second wireless data connection is established). For example, in some instances, the enterprise database 104 may store and/or maintain user profiles for each employee of the enterprise organization corresponding to enterprise database 104 and first enterprise device 106. The user profiles may include the same types of user information sent to the verified user platform 102 by the first enterprise device 106 (e.g., as described above at step 202. In these instances, the verified user platform 102 may identify a user profile corresponding to the user information received at step 202 based on a correlation to the user profile included in the user information stored at the distributed ledger.

Based on identifying the user profile corresponding to the user information, the verified user platform 102 may compare the user information stored at the distributed ledger to the user profile. Based on the comparison, the verified user platform 102 may identify whether any user information has changed. For example, the verified user platform 102 may compare a list of certifications included in the user information to a list of certifications included in the user profile and might, e.g., identify that one or more new certifications have been added to the user profile. In some instances, the verified user platform 102 may only compare the user information to a portion of the user profile, based on rules in the cyber contracts corresponding to the user information restricting access to certain portions of the user profile.

In some examples, in identifying whether there are any changes and/or updates to the user information as described above, the verified user platform 102 may retrieve the user profile from the enterprise database 104. For example, the verified user platform 102 may request the user profile from the enterprise database 104, causing the enterprise database 104 to send the user profile to the verified user platform 102 via the communication interface 113 and while the second wireless data connection is established. Additionally or alternatively, in some instances, the enterprise database 104 may periodically send changes and/or updates to the user information to the verified user platform 102. For example, based on one or more cyber contracts included in the user information, the user of the first enterprise device 106 might have given permission for the enterprise database 104 to periodically (e.g., daily, weekly, monthly, or the like) send updated user information to the verified user platform 102 based on updates to the user profile.

At step 207, the verified user platform 102 may update the user information stored at the distributed ledger. For example, the verified user platform 102 may update the user information based on the changes and/or updates identified by the verified user platform 102 (e.g., as described above at step 206). In some instances, in updating the user information, the verified user platform 102 may modify the distributed ledger by adding a new entry corresponding to the changed and/or updated user information, modifying an existing entry to include the changed and/or updated user information, and/or otherwise incorporating the changed and/or updated user information into the distributed ledger. It should be understood that the functions described above at steps 206-207 may periodically repeat. Accordingly, the user information stored at the distributed ledger by verified user platform 102 may continuously or near-continuously be updated to improve its accuracy.

At step 208, the verified user platform 102 may establish a connection with second enterprise device 108. For example, verified user platform 102 may establish a third wireless data connection with the second enterprise device 108 to link the second enterprise device 108 with the verified user platform 102 (e.g., in preparation for transferring information, receiving requests, establishing a secure channel, and/or other functions). In some instances, the verified user platform 102 may identify whether or not a connection is already established with the second enterprise device 108. If a connection is already established with the second enterprise device 108, the verified user platform 102 might not re-establish the connection. If a connection is not yet established with the second enterprise device 108, the verified user platform 102 may establish the third wireless data connection as described above.

Figure 2C:
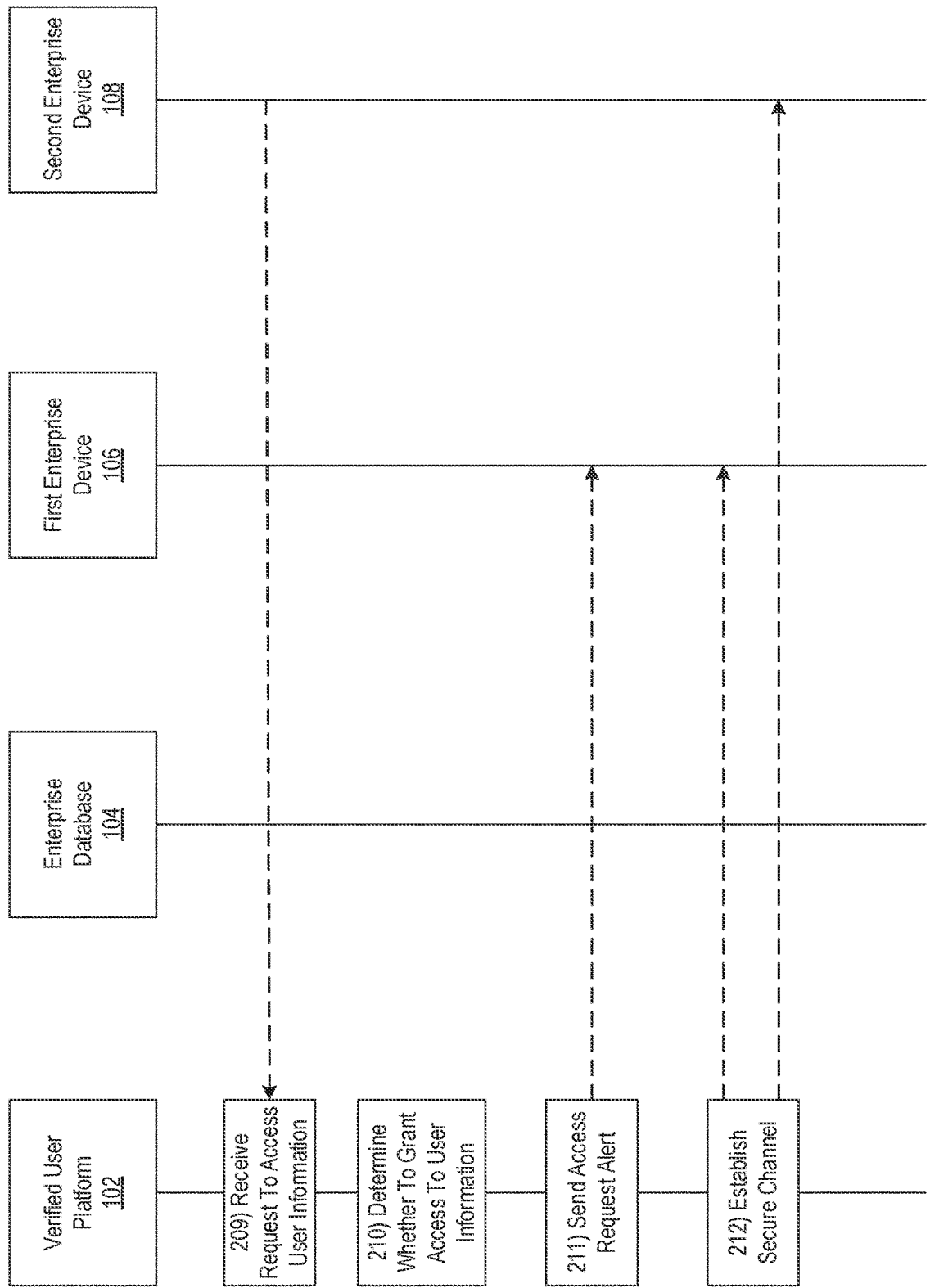

Referring to FIG. 2C, at step 209, the verified user platform 102 may receive a request to access user information from the second enterprise device 108. For example, the verified user platform 102 may receive the request to access user information via the communication interface 113 and while the third wireless data connection is established. In some instances, the request to access user information may specify one or more portions of the user information stored at the distributed ledger. For example, the second enterprise device 108 may send a request to access personal attributes included in the user information (e.g., user characteristics such as work experience, certifications, skills, preferences, and/or other attributes). Additionally or alternatively, in some examples the second enterprise device 108 may request access to user information representing knowledge, such as knowledge of incidents that might affect a venture pursued by the enterprise organization corresponding to the user of second enterprise device 108 (e.g., a financial event impacting the venture and/or the enterprise organization, an environmental event impacting the venture and/or the enterprise organization, a risk event impacting the venture and/or the enterprise organization, a regulatory event impacting the venture and/or the enterprise organization, and/or other incidents), knowledge of interaction opportunities associated with the enterprise organization corresponding to the user of second enterprise device 108 (e.g., employment opportunities, opportunities to communicate with the user of first enterprise device 106, invitations to collaborate on mutual projects, and/or other interaction opportunities), and/or other knowledge. In some examples, the request to access user information may additionally include a request to open a secure communication channel with the verified user platform 102 (e.g., for sending and/or receiving user information stored at the distributed ledger) and/or with the user corresponding to the requested user information (e.g., the user of first enterprise device 106, and/or other users).

At step 210, the verified user platform 102 may determine whether to grant access to the user information stored at the distributed ledger to the second enterprise device 108. For example, the verified user platform 102 may determine whether to grant access to the one or more portions of the user information requested by the second enterprise device 108 at step 209. In determining whether to grant access to the user information, the verified user platform 102 may reference and/or otherwise utilize the one or more permissions and/or rules for accessing the user information included in the user information. For example, as described above (e.g., at step 202), the user information may include one or more cyber contracts (e.g., smart cyber contracts, or the like) defining rules for accessing the user information. The verified user platform 102 may compare the one or more permissions and/or rules to parameters of the request to access user information sent by second enterprise device 108. For instance, the verified user platform 102 may make determinations as to whether the second enterprise device 108 is a device authorized to access the requested one or more portions of the user information based on a device identifier (e.g., device name, IP address, or the like) of the second enterprise device 108, whether the requested one or more portions of the user information are authorized to be accessed generally, and/or other determinations. In some instances, the one or more cyber contracts may include cyber contracts generated by a user (e.g., the user of first enterprise device 106, and/or other users). For example, the one or more cyber contracts may include a cyber contract generated by the user of first enterprise device 106 and requiring that access to personal contact information of the user only be granted to user devices corresponding to particular enterprise organizations. Accordingly, the verified user platform 102 may determine whether the second enterprise device 108 corresponds to one of the particular enterprise organizations (e.g., by identifying an organizational signature, tag, digital reference, and/or other identifiers included in the request sent by the second enterprise device 108). Based on a determination that the second enterprise device 108 does correspond to an enterprise organization that has access to personal contact information of the user, the verified user platform 102 might determine that the second enterprise device 108 should be granted access to the requested personal contact information. Based on a determination that the second enterprise device 108 does not correspond to an enterprise organization that has access to personal contact information of the user, the verified user platform 102 might deny the second enterprise device 108 access to the requested personal contact information.

Additionally or alternatively, in some examples, the one or more cyber contracts may include cyber contracts generated by an enterprise organization (e.g., the venture associated with the first enterprise device 106, and/or other ventures). In these examples, the cyber contracts generated by the enterprise organization may define rules for accessing information in the possession of the user but which is owned by the enterprise organization (e.g., employee records, records associated with ventures pursued by the enterprise organization, incident reports of incidents affecting a venture and/or the enterprise organization, and/or other information). In some instances, the verified user platform 102 may determine whether to grant access by performing similar comparisons to those described above with respect to personal information of the user. Additionally or alternatively, in some examples, the one or more cyber contracts generated by the user and the one or more cyber contracts generated by the enterprise organization may conflict. For example, a cyber contract generated by a user (e.g., the user of first enterprise device 106, and/or other users) may indicate that user devices with an IP address matching the IP address of second enterprise device 108 should be granted access to a requested portion of user information, while a cyber contract generated by an enterprise organization (e.g., the enterprise organization corresponding to the first enterprise device 106) may indicate that user devices with an IP address matching the IP address of second enterprise device 108 should be denied access to the request portion of user information. In these examples, if the verified user platform 102 identifies one or more permissions and/or rules, from any source, denying access to the requested user information, the verified user platform 102 may deny access to the requested portion of user information.

Additionally or alternatively, in some examples, the user information may include a private/public key pairing associated with the user who provided the user information (e.g., the user of first enterprise device 106, and/or other users). In these examples, the verified user platform 102 may determine whether to grant access to the requested user information based on determining whether the request sent by the second enterprise device 108 includes the private key required to decrypt the user information. Based on determining that the request sent by the second enterprise device 108 includes the private key, the verified user platform 102 may decrypt the user information and grant the second enterprise device 108 access to the user information. Based on determining that the request sent by the second enterprise device 108 does not include the private key, the verified user platform 102 may deny the second enterprise device 108 access to the user information.

Additionally or alternatively, in some instances, after first determining to grant the second enterprise device 108 access to the user information based on one or more permissions and/or rules, the verified user platform 102 may further determine that additional confirmation of access is required to determine whether the second enterprise device 108 should be granted access to the user information. For example, the one or more permissions and/or rules may include a requirement that approval information for accessing the user information be granted by the user that owns the user information (e.g., the user of first enterprise device 106, and/or other users). In these instances, the verified user platform 102 may receive the additional confirmation based on information (e.g., biometric information, and/or other information) received in response to sending an access alert, as described below at step 211. Accordingly, the verified user platform 102 may confirm or deny access to the user information based on the approval information received from the first enterprise device 106.

At step 211, the verified user platform 102 may send an access alert to the first enterprise device 106 (e.g., via the communication interface 113 and while the first wireless data connection is established). For example, the verified user platform 102 may send an access alert indicating that a request to access one or more portions of the user information corresponding to the user of first enterprise device 106 was received (e.g., the request received from the second enterprise device 108, as described above at step 209). The verified user platform 102 may send the access alert regardless of the result of the determination of whether to grant access described above at step 210. For example, based on determining that the second enterprise device 108 should not be granted access to the user information, the verified user platform 102 may send an unauthorized access alert indicating that an unauthorized request was received to access user information. Additionally or alternatively, based on determining that the second enterprise device 108 should be granted access to the user information, the verified user platform 102 may send an authorized access alert notifying the first enterprise device 106 that an attempt to access the user information was made and that the verified user platform 102 determined access should be granted.

In some instances, based on an initial determination (e.g., a preliminary and/or provisional determination) to grant the first enterprise device 106 access to the user information, the verified user platform 102 may have determined that additional approval information from the user that owns the user information is required to grant access (e.g., as described above at step 210). In these examples, in sending the access alert (i.e., the authorized access alert), the verified user platform 102 may additionally transmit and cause display of a user interface at the first enterprise device 106. For example, the verified user platform 102 may transmit and cause display of an access alert interface. In transmitting and causing display of the access alert interface, the verified user platform 102 may send one or more display commands directing the first enterprise device 106 to display a user interface. Based on or in response to the one or more display commands, the first enterprise device 106 may display the access alert interface.

Figure 3:
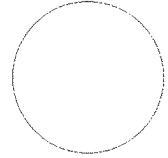
FIG. 3 depicts an illustrative graphical user interface depicting an alert generated by a collaborative verified user platform using distributed ledger technology in accordance with one or more example arrangements.
Figure 3:
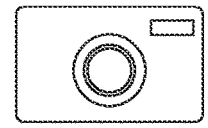

For instance, in displaying the access alert interface, the first enterprise device 106 may display a graphical user interface similar to access alert interface 300, which is illustrated in FIG. 3. Referring to FIG. 3, in some instances, the access alert interface 300 may include information corresponding to the requested one or more portions of the user information and/or information corresponding to the second enterprise device 108. For example, the access alert interface 300 may include information such as a notification that user information corresponding to the user was requested, an indication of which portion and/or portions of the user information correspond to the request, an indication of the device (e.g., second enterprise device 108, and/or other enterprise devices) requesting access to the user information, an indication that the verified user platform 102 determined access should be granted to the user information, and/or other information. The access alert interface 300 may also display interface elements or selectable options requesting approval information (e.g., user input and/or biometric approval). For example, the access alert interface 300 may display one or more of: an information entry field, a button or buttons, toggle or toggles, check box or boxes, a fingerprint scanner, a retina scanner/camera, and/or other interface elements. For example, as illustrated in FIG. 3, the interface elements may be one or more buttons the user might toggle to confirm or deny requested access to the user information, a fingerprint scanner for biometric approval confirming or denying requested access to the user information, and/or a button the user might toggle to activate a retina scanner and/or camera for biometric approval confirming or denying requested access to the user information. In some instances, based on user input confirming or denying requested access to the user information, the first enterprise device 106 may provide the user input to the verified user platform 102.

Referring back to FIG. 2C and step 211, the verified user platform 102 may, based on receiving user input (e.g., biometric approval information, or the like) confirm or deny access to the user information based on the approval information received from the first enterprise device 106. For example, based on receiving biometric approval information (e.g., a thumbprint, a retina scan, a face scan, and/or other biometric approval information) the verified user platform 102 might confirm that the second enterprise device 108 should be granted access to the user information. In other instances, based on receiving user input selecting a toggle/button denying requested access to the user information, the verified user platform 102 might deny the second enterprise device 108 access to the user information, even if the verified user platform 102 determined that the second enterprise device 108 should be granted access to the user information based on one or more permissions and/or rules (e.g., as described above at step 210).

In some examples, based on determining that the second enterprise device 108 should be granted access to the user information (e.g., based on the determination described above at step 210 and/or based on approval information, such as biometric approval information or the like, received from the first enterprise device 106), the verified user platform 102 may establish a secure channel between the first enterprise device 106 and the second enterprise device 108 at step 212. In some instances, based on determining that the second enterprise device 108 should not be granted access to the user information (e.g., based on the determination described above at step 210 and/or based on approval information, such as biometric approval information or the like, received from the first enterprise device 106) the verified user platform 102 may identify the request to access the user information as a permissions violation. In these instances, the verified user platform 102 might proceed to detect a permissions violation (e.g., as described below at step 221). In these instances, the verified user platform 102 might not perform the functions described below at steps 212-220.

At step 212, based on determining that the second enterprise device 108 should be granted access to the user information and/or based on receiving approval information from the first enterprise device 106 granting the second enterprise device 108 access to the user information, the verified user platform 102 may establish one or more secure channels. In establishing the one or more secure channels, the verified user platform 102 may establish channels of communication (e.g., for sending/receiving digital information and/or for performing other functions) between communication interfaces of different devices that are secured through one or more security protocols (e.g., encryption protocols, or the like) and routed through the verified user platform 102. For example, the verified user platform 102 may establish a secure channel between the verified user platform 102 and the second enterprise device 108 (e.g., via the communication interface 113 and while the third wireless data connection is established). In these examples, based on establishing the secure channel between the verified user platform 102 and the second enterprise device 108, the verified user platform 102 may provide the second enterprise device 108 with access to the information (e.g., by allowing the second enterprise device 108 to access one or more entries of the distributed ledger, and/or by sending the requested user information to the second enterprise device 108). In these instances, the verified user platform 102 might proceed to step 224 and might not perform the functions described below at steps 213-223.

Additionally or alternatively, in some examples, the verified user platform 102 may establish a secure channel between the first enterprise device 106 and the second enterprise device 108, routed through the verified user platform 102 (e.g., via the communication interface 113 and while the first and third wireless data connections are established). For example, the request to access user information received at step 209 may have been and/or included a request to establish a secure channel with the user associated with the user information. In these examples, based on the verified user platform 102 establishing the secure channel between the first enterprise device 106 and the second enterprise device 108, the first enterprise device 106 and the second enterprise device 108 may send one or more communications to each other via the secure channel. In some instances, the one or more communications sent via the secure channel may include one or more secure requests, which the verified user platform 102 may process (e.g., as described below at steps 213-220). For example, in some instances, the first enterprise device 106 may send a communication including an incident report and requesting the incident report be provided to the second enterprise device 108. In these instances, the verified user platform 102 may process the request by performing the functions described below at steps 213-215 and might not perform the functions described below at steps 216-220. Additionally or alternatively, in some examples, the first enterprise device 106 may send a communication including an interaction opportunity and requesting the interaction opportunity be provided to the second enterprise device 108. In these instances, the verified user platform 102 may process the request by performing the functions described below at steps 216-220 and might not perform the functions described below at steps 213-215.

Figure 2D:
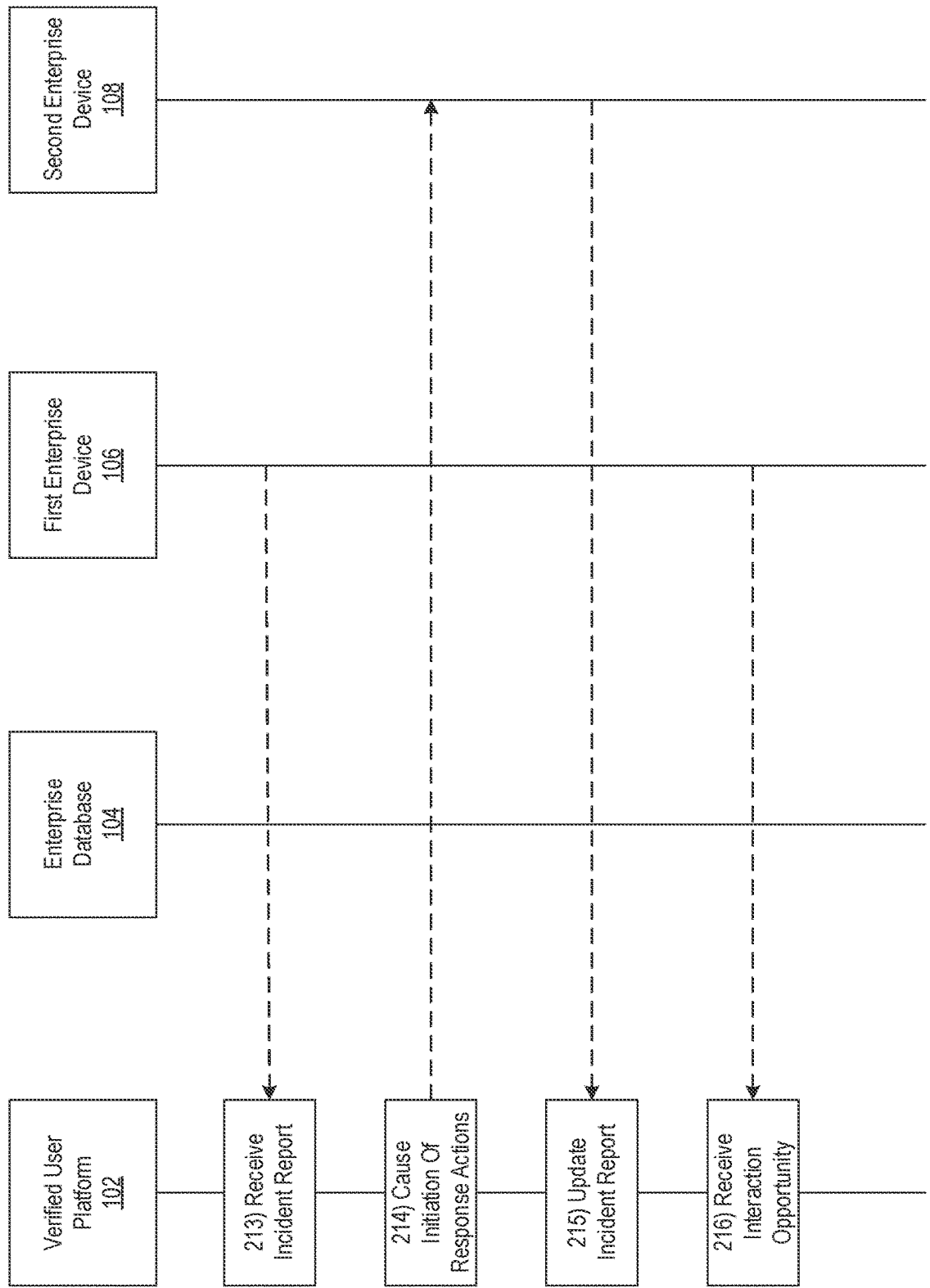

Referring to FIG. 2D, at step 213, based on establishing the one or more secure channels, the verified user platform 102 may receive an incident report from the first enterprise device 106 (e.g., via the communication interface 113 and while the first wireless data connection is established). For example, the verified user platform 102 may receive the incident report from the first enterprise device 106 in response to one or more communications sent by the second enterprise device 108 via the secure channel requesting user information (i.e., incident reports) from the verified user platform 102 and/or from the first enterprise device 106. In some examples, the incident report may include information of an incident affecting a venture/enterprise of the enterprise organizations associated with second enterprise device 108 and first enterprise device 106. For instance, the incident report may include information of incidents such as a financial event (e.g., an economic change in a region the enterprise organization operate within, a change in a currency value, or the like), an environmental event (e.g., a natural disaster, or the like), a risk event (e.g., an identification of a potential malicious actor engaged in the same enterprise as the enterprise organizations, an identification of malicious software associated with systems used by the enterprise organizations, or the like), a regulatory event (e.g., a change in one or more laws or regulations affecting the enterprise organizations, or the like), and/or other events impacting both the enterprise organization associated with second enterprise device 108 and the enterprise organization associated with first enterprise device 106. In some instances, based on receiving the incident report, the verified user platform 102 may store the incident report to the distributed ledger (e.g., by adding and/or modifying an entry to the distributed ledger and corresponding to the incident report).

At step 214, based on receiving the incident report from the first enterprise device 106, the verified user platform 102 may cause the initiation of one or more response actions by the second enterprise device 108. For example, the verified user platform 102 may cause the initiation of one or more response actions by providing the incident report to the second enterprise device 108 (e.g., via the secure channel). The one or more response actions may be and/or include actions configured to address one or more events identified by the incident report. For example, the one or more response actions may be and/or include the second enterprise device 108 generating a report and/or alert for the enterprise organization associated with second enterprise device 108, causing the second enterprise device 108 to modify protocols of one or more systems associated with the second enterprise device 108, causing the second enterprise device 108 to initiate an investigation into an event identified by the incident report, and/or other response actions.

At step 215, based on the one or more response actions initiated by the second enterprise device 108, the verified user platform 102 may update the incident report. For example, the verified user platform 102 may update the incident report to include a record of the one or more response actions initiated by the second enterprise device 108 such that additional user devices may access the updated incident report and see what actions were taken by the second enterprise device 108. In updating the incident report, the verified user platform 102 may add and/or modify an entry on the distributed ledger and corresponding to the incident report.

At step 216, based on establishing the one or more secure channels, the verified user platform 102 may receive an interaction opportunity from the first enterprise device 106 (e.g., via the secure channel). For example, the verified user platform 102 may receive the interaction opportunity from the first enterprise device 106 in response to one or more communications sent by the second enterprise device 108 via the secure channel requesting user information (i.e., interaction opportunities) from the verified user platform 102 and/or from the first enterprise device 106. In some examples, the interaction opportunity may be and/or include an employment opportunity (e.g., a job posting provided by the first enterprise device 106, an interview timeframe for an interview with the user of the first enterprise device 106, and/or other employment opportunities). Additionally or alternatively, in some instances, the interaction opportunity may be and/or include a request to communicate with a user associated with the venture corresponding to both the first enterprise device 106 and the second enterprise device 108, such as the user associated with the second enterprise device 108. For example, the interaction opportunity may be a request from the first enterprise device 106 indicating the user of the first enterprise device 106 desires to discuss an issue related to the enterprise/venture of the enterprise organization with a qualified individual working at a similar enterprise organization. Additionally or alternatively, in some examples, the interaction opportunity may be and/or include an invitation to collaborate on a project associated with the venture corresponding to both the first enterprise device 106 and the second enterprise device 108.

Figure 2E:
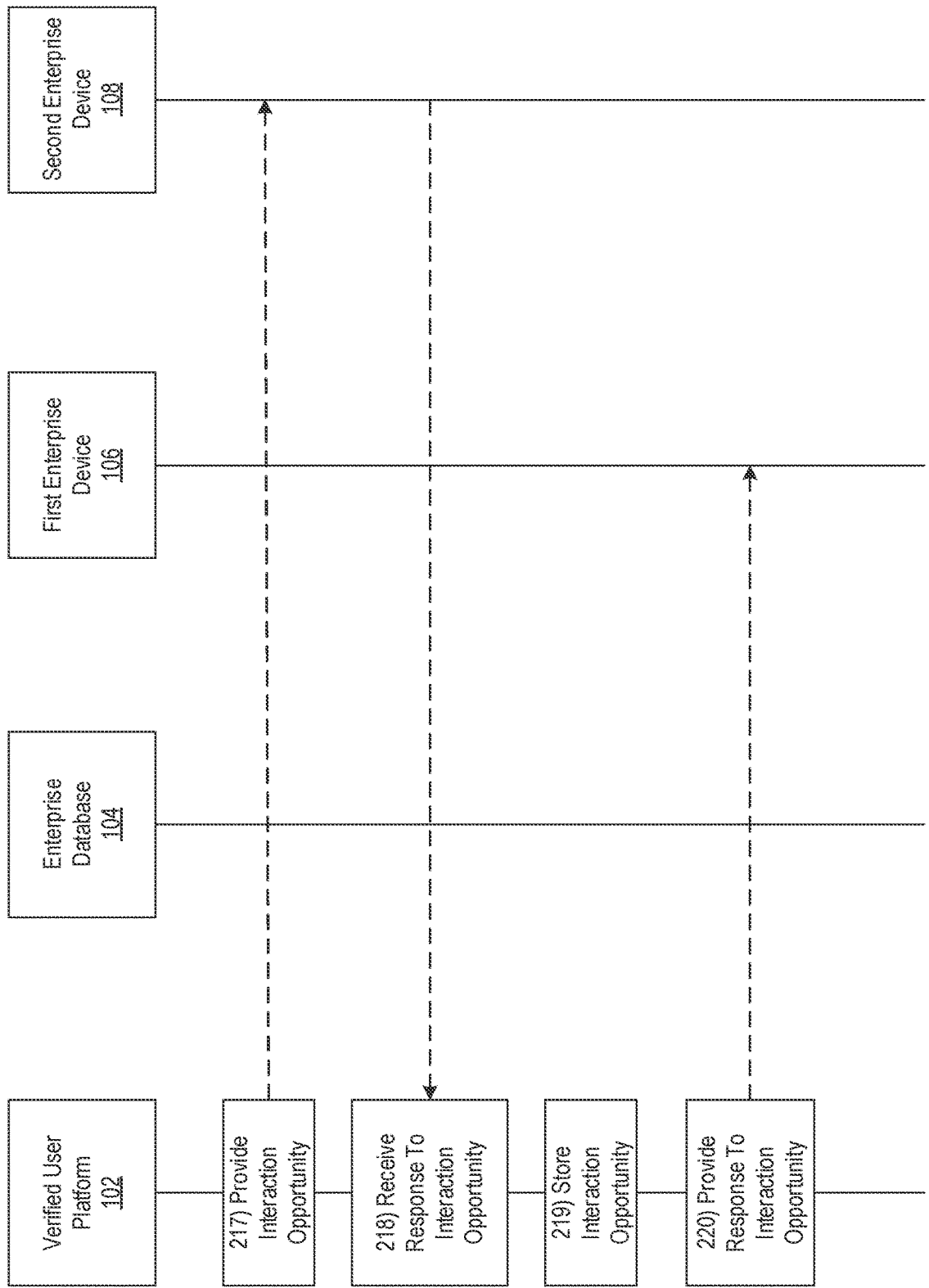

Referring to FIG. 2E, at step 217, the verified user platform 102 may provide the interaction opportunity to the second enterprise device 108 (e.g., via the secure channel). In some instances, the verified user platform 102 may provide the interaction opportunity to the second enterprise device 108 based on one or more instructions included in the interaction opportunity received from the first enterprise device 106. For example, in a scenario where the interaction opportunity was a request to communicate with a user associated with the venture corresponding to both the first enterprise device 106 and the second enterprise device 108, the interaction opportunity may have specified that the user of the first enterprise device 106 wished to communicate with the user of the second enterprise device 108. Accordingly, the verified user platform 102 may transmit the request including the interaction opportunity to the second enterprise device 108. Additionally or alternatively, in some instances, the verified user platform 102 may provide the interaction opportunity based on a request for user information received from the second enterprise device 108 (e.g., the request to access the user information received at step 209, as described above). For instance, the second enterprise device 108 may have requested user information indicating employment opportunities associated with the user of the first enterprise device 106. Accordingly, based on receiving an interaction opportunity that is and/or includes an employment opportunity associated with the user of the first enterprise device 106, the verified user platform 102 may transmit the employment opportunity to the second enterprise device 108.

At step 218, based on providing the interaction opportunity to the second enterprise device 108, the verified user platform 102 may receive a response to the interaction opportunity (e.g., via the secure channel) from the second enterprise device 108. For example, in a scenario where the interaction opportunity was an employment opportunity, the verified user platform 102 may receive a resumed, an interview request, and/or other responses to the interaction opportunity. Additionally or alternatively, in a scenario where the interaction opportunity was an invitation to collaborate on a project associated with the venture corresponding to both the first enterprise device 106 and the second enterprise device 108, the verified user platform 102 may receive an agreement from the user of the second enterprise device 108 indicating a willingness to collaborate, a contract for collaborating on the project, and/or other responses to the interaction opportunity.

At step 219, based on receiving the response to the interaction opportunity, the verified user platform 102 may store the interaction opportunity to the distributed ledger. For instance, the verified user platform 102 may modify the distributed ledger by adding a new entry corresponding to the interaction opportunity, modifying an existing entry to include the interaction opportunity, and/or otherwise incorporating the interaction opportunity into the distributed ledger. In storing the interaction opportunity, the verified user platform 102 may concurrently store an indication of the response to the interaction opportunity.

At step 220, based on receiving the response to the interaction opportunity, the verified user platform 102 may provide the response to the interaction opportunity to the first enterprise device 106. For example, the verified user platform 102 may transmit the response to the interaction opportunity to the first enterprise device 106 via the communication interface 113 and while the first wireless data connection is established. In some instances, in providing the response to the interaction opportunity to the first enterprise device 106, the verified user platform 102 may additionally establish, initiate, and/or otherwise host a discussion between the user of the first enterprise device 106 and the user of the second enterprise device 108. For example, the response to the interaction opportunity may be and/or include a request to communicate virtually (e.g., via means of virtual communication such as a webchat, a video call, and/or other means of virtual communication) with the user of the first enterprise device 106. Accordingly, the verified user platform 102 may, via the secure channel, host the discussion between the user of the first enterprise device 106 and the user of the second enterprise device 108 via a means of virtual communication such as a webchat, a video call, and/or other means of virtual communication.

Figure 2F:
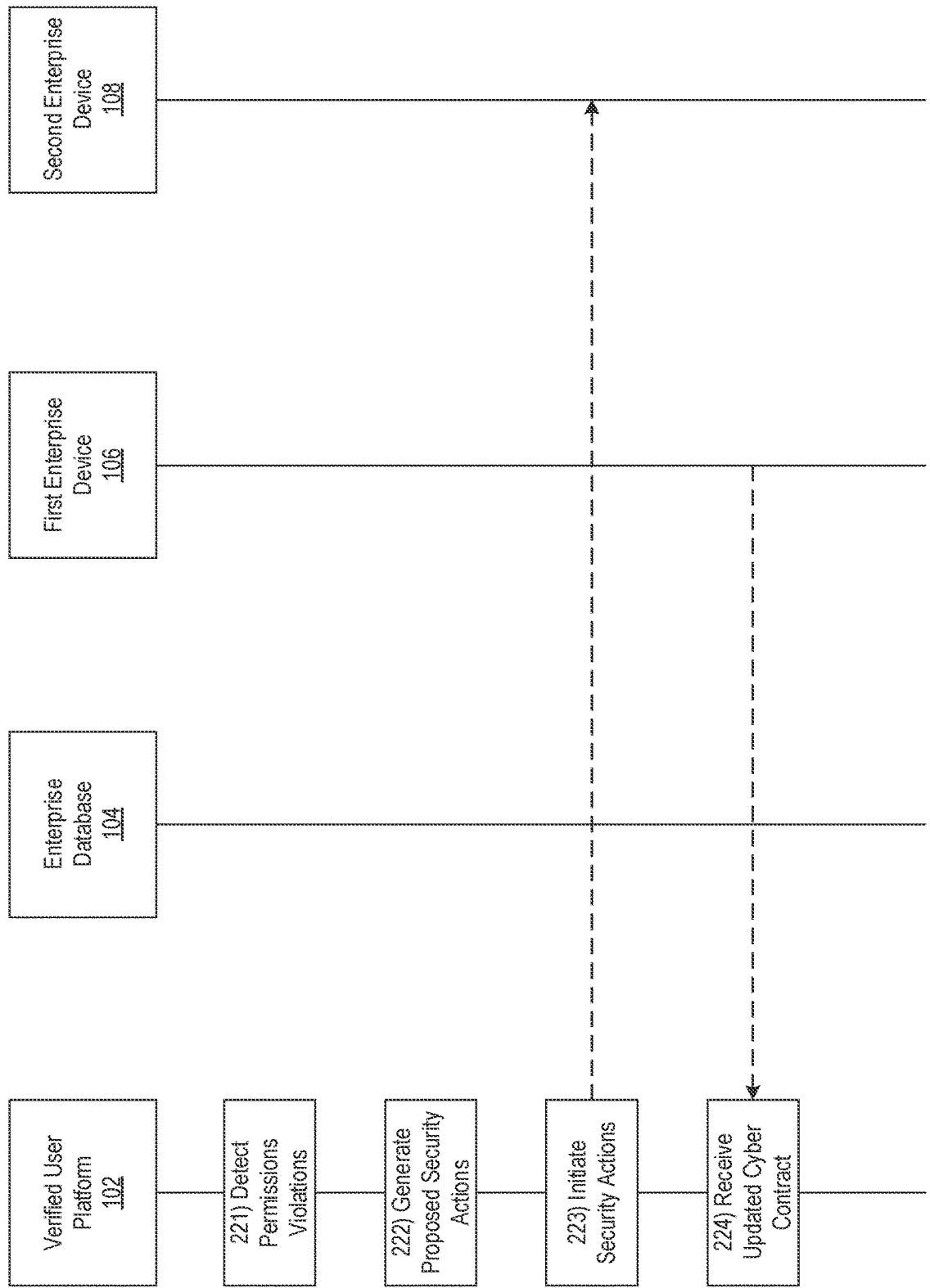

Referring to FIG. 2F, at step 221, the verified user platform 102 may detect permissions violations. For example, the verified user platform 102 may detect one or more violations of one or more permissions associated with accessing the user information stored at the distributed ledger (e.g., based on one or more cyber contracts associated with the user information, and/or based on other permissions and/or rules). In some instances, in detecting permissions violations, the verified user platform 102 may detect one or more violations based on a determination that the second enterprise device 108 should not be granted access to the user information and/or based on sending an unauthorized access alert indicating that an unauthorized request was received to access user information (e.g., as described above at step 211). For example, based on determining that a request to access the user information, received from the second enterprise device 108, fails to satisfy a rule (e.g., a rule included in a cyber contract included in and/or associated with the user information, or the like) requiring that the user device requesting the user information correspond to a particular IP address, the verified user platform 102 may determine that a permission violation has occurred.

Additionally or alternatively, in some examples, the verified user platform 102 may detect one or more violations based on monitoring communications sent/received over one or more secure channels (e.g., the one or more secure channels established by the verified user platform 102, as described above at step 213). For example, after initially granting the second enterprise device 108 access to the user information and establishing one or more secure channels, the verified user platform 102 may continuously compare the communications sent/received over the one or more secure channels to one or more permissions and/or rules related to the user information to determine whether any permissions violations have occurred. For instance, based on monitoring the communications, the verified user platform 102 may determine that the second enterprise device 108 sent a request for one or more incident reports that include information the second enterprise device 108 is not authorized to access (e.g., by comparing one or more identifiers of the second enterprise device 108 to one or more rules indicating which devices are permitted to access the one or more incident reports). Accordingly, the verified user platform 102 may detect that a permission violation has occurred based on the request of the second enterprise device 108. Additionally or alternatively, in some instances, the verified user platform 102 may determine that the second enterprise device 108 has sent a second request to access a portion of the user information (e.g., via the secure channel). In these instances, the verified user platform 102 may perform the determining functions described above at step 211 to determine whether the second enterprise device 108 should be granted access to the portion of the user information included in the second request. Based on a determination that the second enterprise device 108 should not be granted access to the portion of the user information included in the second request, the verified user platform 102 may detect that a permission violation has occurred based on the second enterprise device 108 requesting user information, via the secure channel, that the second enterprise device 108 was not authorized to access.

In some examples, in detecting permissions violations, the verified user platform 102 may generate an indication such as a report, a record, a notification, and/or other indications that a permission was violated. In some instances, the indication may include information identifying the permission violation (e.g., the permission and/or rule that was violated, the source of the violation (e.g., the second enterprise device 108, and/or other enterprise devices), or the like).

At step 222, based on detecting one or more permissions violations, the verified user platform 102 may generate one or more proposed security actions. In some examples, the verified user platform 102 may generate the one or more proposed security actions by inputting information of the detected permissions violations (e.g., an identifier of the device, such as second enterprise device 108, which caused a permission violation, one or more identifications of the rules and/or permissions that were violated, and/or other information) into the response model. In generating the one or more proposed security actions, based on inputting the information of the detected permissions violations into the response model, the verified user platform 102 may utilize the one or more historical cyber contracts used to train the response model. For example, the verified user platform 102 may use the response model to identify whether the one or more permissions violations represent violations of one or more permissions that match the one or more permissions associated with a historical cyber contract. For instance, a permission violation may represent a violation of a permission and/or rule requiring that any device requesting access to a specific portion of the user information (e.g., personal contact information, and/or other portions of the user information) must be associated with a particular enterprise organization. The verified user platform 102 may use the response model to identify that one or more historical cyber contracts used to train the response model included a permission and/or rule requiring that any device requesting access to the specific portion of the user information must be associated with the same particular enterprise organization. Accordingly, in the above example, the verified user platform 102 may generate one or more proposed security actions based on security actions identified by the one or more historical cyber contracts (e.g., terminating a secure channel, filtering one or more messages sent via a secure channel, denying access to a requested portion of the user information, storing a record of the permission violation, and/or other security actions).

Additionally or alternatively, in some examples, the verified user platform 102 may cause the response model to mine (e.g., analyze, parse, read, translate, and/or otherwise mine) the information of the permissions violations to identify one or more permissions that were violated. The response model may compare the one or more permissions that were violated to the one or more historical cyber contracts to identify one or more matching historical cyber contracts that include the same one or more permissions. Based on the comparison, the verified user platform 102 may use the response model to generate the one or more proposed security actions based on which security actions are associated with the one or more matching historical cyber contracts and satisfy a threshold score. For example, the verified user platform 102 may have previously trained the response model to employ a comparison algorithm to generate security action scores. For instance, the response model may execute the comparison algorithm using the following constraints parameters for each security action associated with any of the one or more matching historical cyber contracts:

If(number of matching historical cyber contracts associated with security action) ≤ $\frac{\text{(total number of matching historical cyber contracts)}}{2}$, then:

security action score = 0%.

If else, then:

security action score = 100%.

In this example, if the sum of the number of matching historical cyber contracts that are associated with a given security action is less than or equal to half of the total number of matching historical cyber contracts, the response model may generate a security action score of 0% for that security action. Else, the response model may generate a security action score of 100%. Based on generating a security action score, the verified user platform 102 may use the response model to compare the security action score to a threshold score to determine whether the security action score satisfies the threshold score. For example, the security action score may be 100%, and the threshold score may be 50%. Based on the comparison, the response model may determine that the security action score satisfies the threshold score. Based on a determination that the security action score for a particular security action associated with the one or more historical cyber contracts satisfies the threshold score, the verified user platform 102 may cause the response model to generate a proposed security action matching the particular security action. Alternatively, based on a determination that the security action score for a particular security action does not satisfy the threshold score, the verified user platform 102 may cause the response model to generate one or more proposed security actions that do not include the particular security action.

It should be understood that while the above examples refer to a single security action score and a single proposed security action, the verified user platform 102 may perform the functions described above for a plurality of different security actions in generating the one or more proposed security actions.

At step 223, the verified user platform 102 may initiate one or more security actions. For example, the verified user platform 102 may initiate the one or more proposed security actions generated by the response model at step 222, based on detecting permissions violations. In initiating the one or more security actions, the verified user platform 102 may terminate a secure channel, filter one or more messages sent via a secure channel, deny access to a requested portion of the user information, store a record of the permission violation, and/or perform other security actions. For example, the verified user platform 102 may terminate a secure channel between the second enterprise device 108 and the first enterprise device 106 and/or a secure channel between the second enterprise device 108 and the verified user platform 102, preventing the second enterprise device 108 from communicating with the first enterprise device 106 and/or accessing the user information stored at the verified user platform 102. Additionally or alternatively, the verified user platform 102 may store a record of the permission violation that caused the verified user platform 102 to initiate the one or more security actions. For example, the verified user platform 102 may store a record of the permission violation indicating the source of the violation (e.g., second enterprise device 108, and/or other enterprise devices), the permission and/or rule that was violated, and/or other information. In storing the record of the permission violation, the verified user platform 102 may store the record to the distributed ledger. For instance, the verified user platform 102 may modify the distributed ledger by adding a new entry corresponding to the record, modifying an existing entry to include the record, and/or otherwise incorporating the record into the distributed ledger.

At step 224, the verified user platform 102 may receive an updated cyber contract from the first enterprise device 106. For example, the verified user platform 102 may receive the updated cyber contract based on initiating the one or more security actions. Additionally or alternatively, in some examples, the verified user platform 102 may receive the updated cyber contract as part of a periodic update to the one or more permissions restricting access to the user information. The updated cyber contract may add and/or modify one or more rules and/or permissions restricting access to the user information. In some examples, the updated cyber contract may include one or more rules determined by an enterprise organization different from the enterprise organization originally associated with the first enterprise device 106. For example, if the user of the first enterprise device 106 changes their employment to a new enterprise organization, the updated cyber contract may include one or more rules and/or permissions associated with the new enterprise organization. In some examples, the verified user platform 102 may receive one or more additional updated cyber contracts (e.g., as part of a periodic update to the one or more permissions).

Referring to FIG. 2G, at step 225, based on receiving the updated cyber contract, the verified user platform 102 may update one or more permissions restricting access to the user information. For example, the updated cyber contract may include a new rule requiring that devices requesting access to the user information correspond to a particular geographic region. Accordingly, the verified user platform 102 may update the one or more permissions and/or rules associated with the user information to include the new rule. In updating the one or more permissions, the verified user platform 102 may store the updated cyber contract to the distributed ledger. For instance, the verified user platform 102 may modify the distributed ledger by adding a new entry corresponding to the updated cyber contract, modifying an existing entry to include the updated cyber contract, and/or otherwise incorporating the cyber contract into the distributed ledger. In some examples, based on updating the one or more permissions, the verified user platform 102 may use the updated one or more permissions to determine whether to grant access to the user information (e.g., using the functions described above at step 210) when the verified user platform 102 receives additional requests to access the user information.

At step 226, based on receiving the updated cyber contract, the verified user platform 102 may refine, validate, and/or otherwise update the response model. For example, the verified user platform 102 may update the response model based on the updated cyber contract. In some instances, updating the response model may include inputting the updated cyber contract into the response model. By providing this input into the response model, the verified user platform 102 may create an iterative feedback loop that may continuously and dynamically refine the response model to improve its accuracy. For example, based on inputting the updated cyber contract, the verified user platform 102 may cause the response model to generate proposed security actions in future iterations of the feedback loop by storing, based on the updated cyber contract, one or more correlations between the one or more proposed security actions generated at step 222 and the updated cyber contract. For instance, based on identifying a rule in the updated cyber contract indicating that violations of the rule should result in termination of a secure channel, the verified user platform 102 may store a correlation between the security action of terminating a secure channel and the rule included in the updated cyber contract. Accordingly, in future iterations of the feedback loop, the response model may generate a proposed security action of terminating a secure channel based on input of information of a permission violation that violates the rule included in the updated cyber contract.

In updating the response model, the verified user platform 102 may improve the accuracy and effectiveness of the proposed security action generation process, which may, e.g., result in more efficient training of machine learning models trained by the verified user platform 102 (and may in some instances, conserve computing and/or processing power/resources in doing so). The verified user platform 102 may further cause the response model to improve the methods if implementing a verified user platform described herein by generating more accurate proposed security actions, as described above.

Figure 4A:
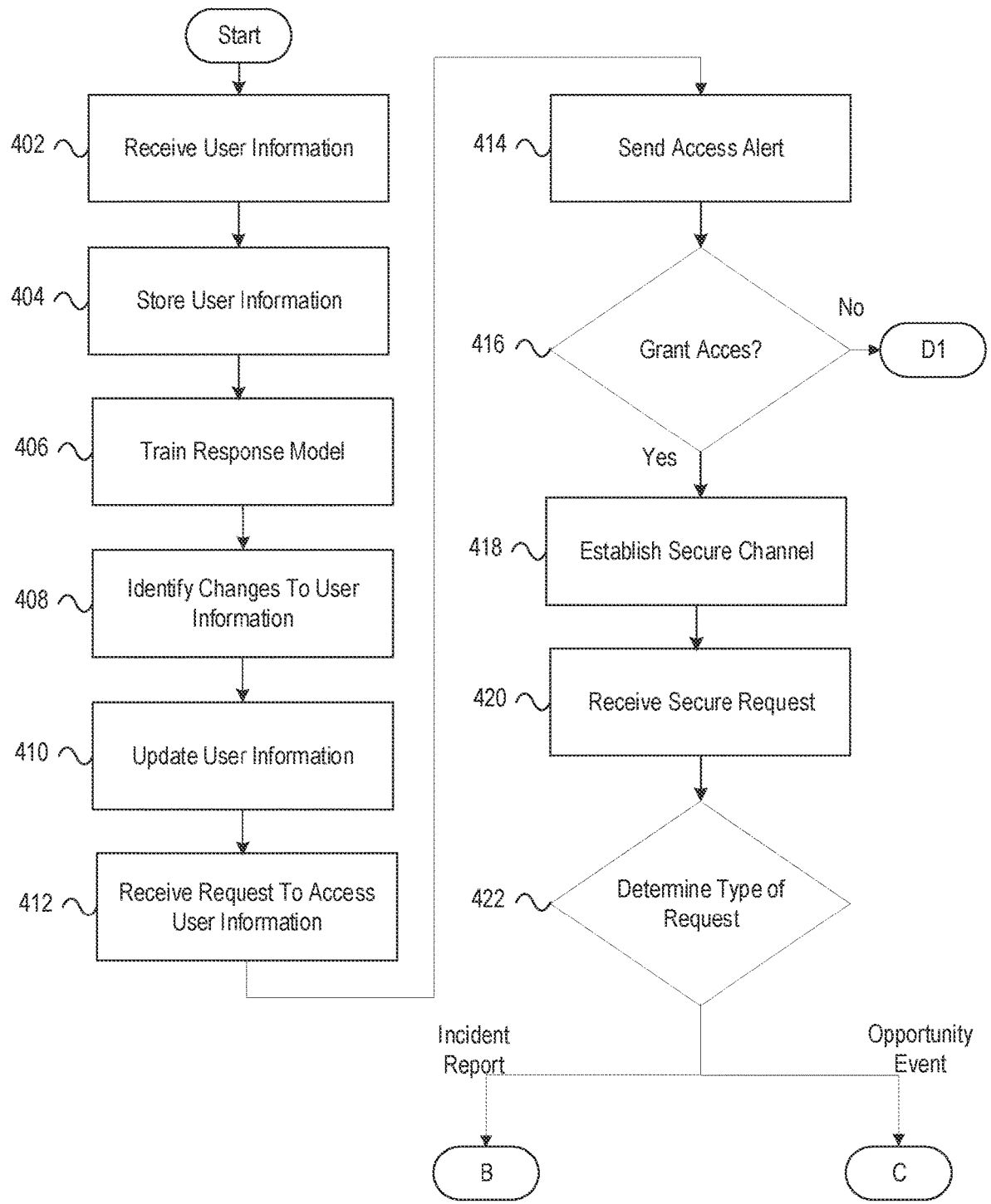
FIGS. 4A-4D depict an illustrative method for implementing a collaborative verified user platform using distributed ledger technology in accordance with one or more example arrangements.

FIGS. 4A-4D depict an illustrative method for implementing a collaborative verified user platform using distributed ledger technology in accordance with one or more example arrangements. Referring to FIG. 4A, at step 402, a computing device having at least one processor, a communication interface, and memory may receive user information. At step 404, the computing device may store the user information (e.g., to a distributed ledger). At step 406, the computing device may train a machine learning model. For example, the computing device may train a response model to generate proposed security actions based on input of information of permissions violations. At step 408, the computing device may identify changes to the user information stored by the computing device may. At step 410, the computing device may update the user information (e.g., by updating the distributed ledger). At step 412, the computing device may receive a request to access the user information. At step 414, the computing device may send an access alert based on the request to access the user information. At step 416, the computing device may determine whether to grant access to the user information to the device requesting access to the user information. Based on a determination that the computing device should not grant access to the user information, the computing device may proceed to step 446 at FIG. 4D and generate proposed security actions. Based on a determination that the computing device should grant access to the user information, the computing device may proceed to step 418 and establish a secure channel.

At step 418, based on a determination that the computing device should grant access to the user information, the computing device may establish a secure channel. For example, the computing device may establish a secure channel between two enterprise devices (e.g., the device requesting access to the user information and the device that provided the user information at step 402). At step 420, the computing device may receive a secure request over the secure channel. At step 422, the computing device may determine a type of request related to the secure request. Based on determining that the request was related to an incident report, the computing device may proceed to step 424 at FIG. 4B and receive an incident report. Based on determining that the request was related to an interaction opportunity, the computing device may proceed to step 434 at FIG. 4C and receive an interaction opportunity.

Figure 4B:
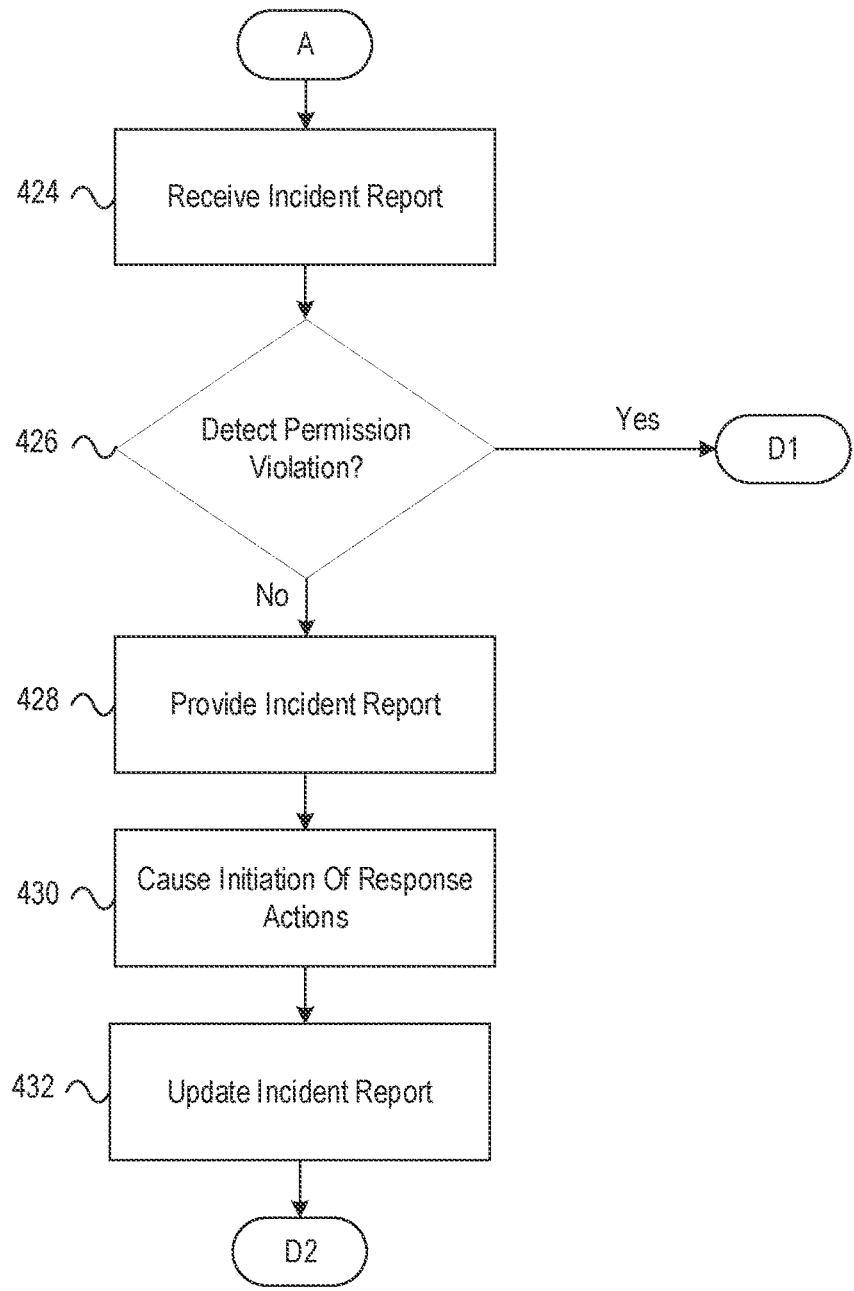

Referring to FIG. 4B, at step 424, based on determining that the request was related to an incident report, the computing device may receive an incident report. At step 426, the computing device may detect whether a permission violation has occurred. Based on detecting that a permission violation has occurred, the computing device may proceed to step 446 at FIG. 4D and generate proposed security actions. Based on detecting that no permission violation has occurred, the computing device may proceed to step 428 and provide the incident report. At step 428, based on detecting that no permission violation has occurred, the computing device may provide the incident report to an enterprise device. At step 430, the computing device may cause initiation of one or more response actions based on providing the incident report to an enterprise device. At step 432, the computing device may update the incident report (e.g., based on the one or more response actions). After updating the incident report, the computing device may proceed to step 450 at FIG. 4D and receive an updated cyber contract.

Figure 4C:
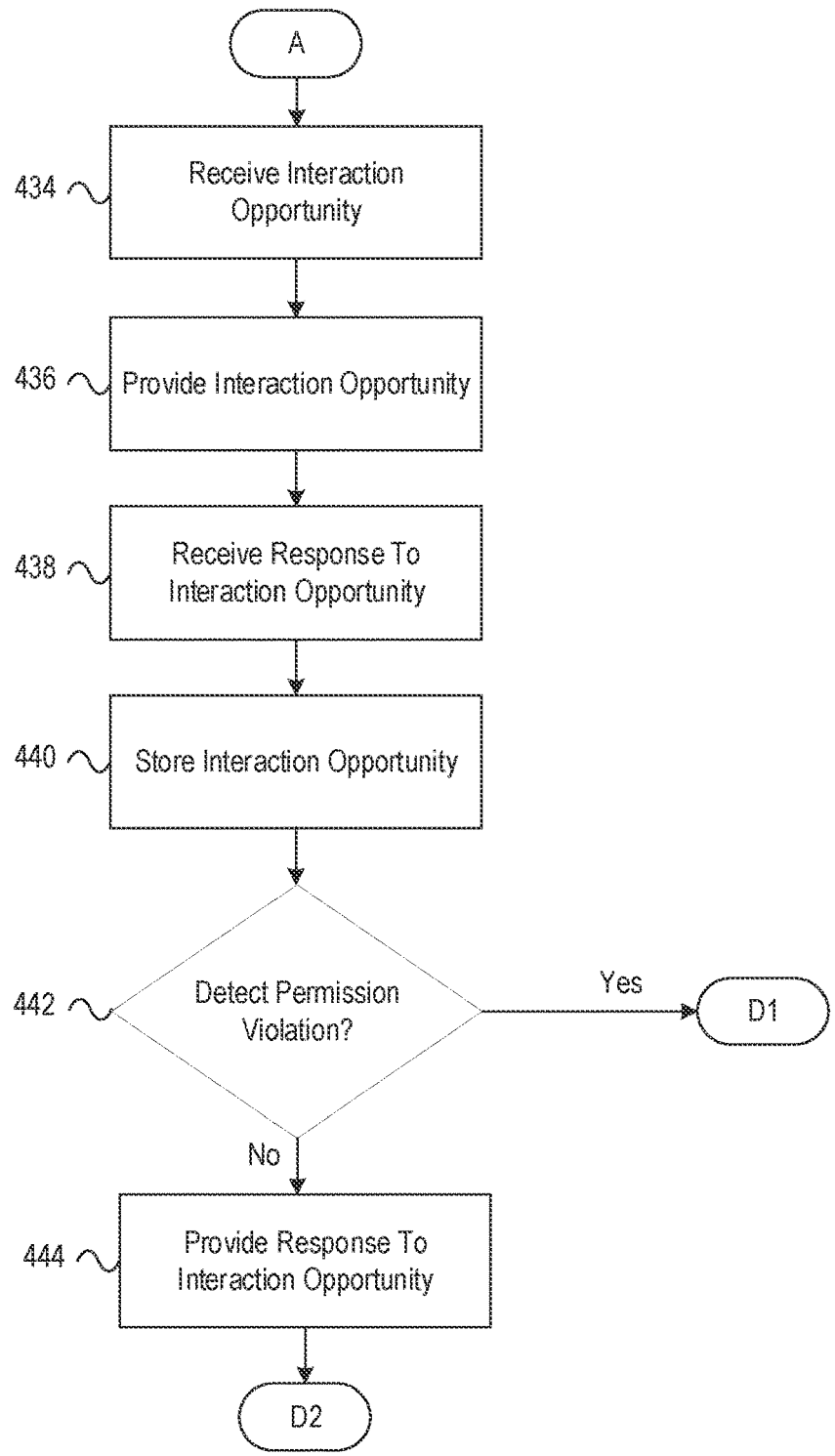

Referring to FIG. 4C, at step 434, based on determining that the request was related to an interaction opportunity, the computing device may receive an interaction opportunity from a first enterprise device. At step 436, the computing device may provide the interaction opportunity to a second enterprise device. At step 438, the computing device may receive a response to the interaction opportunity from the enterprise device. At step 440, the computing device may store the interaction opportunity (and, in some instances, the response to the interaction opportunity). For example, the computing device may store the interaction opportunity to the distributed ledger. At step 442, the computing device may detect whether a permission violation has occurred. Based on detecting that a permission violation has occurred, the computing device may proceed to step 446 at FIG. 4D and generate proposed security actions. Based on detecting that no permission violation has occurred, the computing device may proceed to step 444 and provide the response to the interaction opportunity. At step 444, based on detecting that no permission violation has occurred, the computing device may provide a response to the interaction opportunity. For example, the computing device may provide the response to the interaction opportunity to the first enterprise device. After providing the response to the interaction opportunity to the first enterprise device, the computing device may proceed to step 450 at FIG. 4D and receive an updated cyber contract.

Figure 4D:
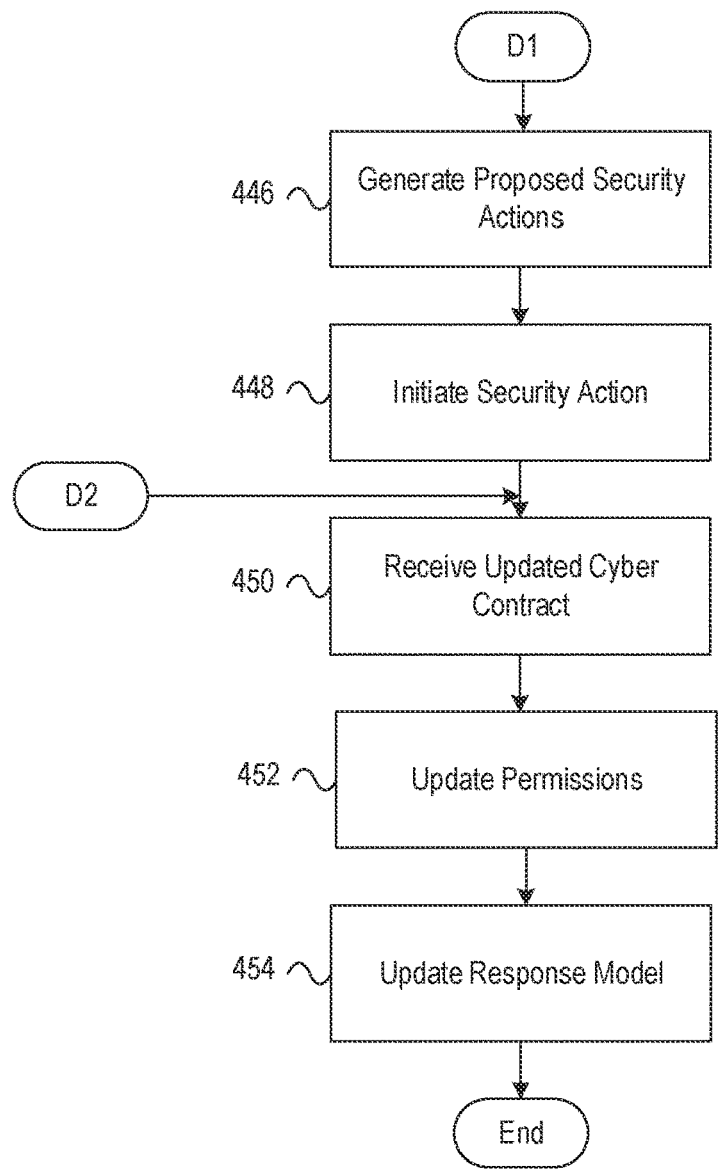
Figure 4E:
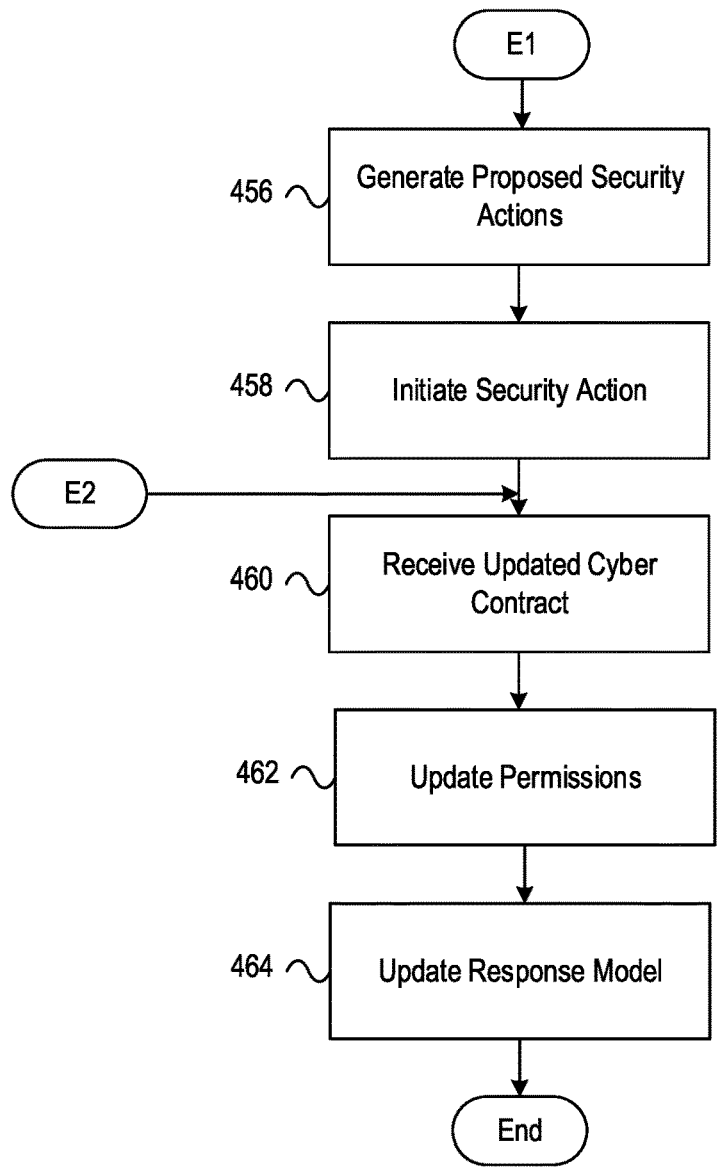

Referring to FIG. 4D, at step 446, the computing device may generate proposed security actions. For example, the computing device may generate proposed security actions using a response model. At step 448, the computing device may initiate one or more security actions. At step 450, the computing device may receive an updated cyber contract. In some instances, the computing device may receive the updated cyber contract based on detecting that no permission violation occurred at steps 426 or 442. At step 452, the computing device may update permissions related to accessing the user information. For example, the computing device may update the permissions based on the updated cyber contract. At step 454, the computing device may update the response model. For example, the computing device may update the response model based on the updated cyber contract.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various arrangements. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative arrangements, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative arrangements thereof. Numerous other arrangements, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
   at least one processor;
   a communication interface communicatively coupled to the at least one processor; and
   memory storing computer-readable instructions that, when executed by the at least one processor, cause the computing platform to:
      receive, from a first user device, user information corresponding to a first user;
      store the user information at a distributed ledger maintained by the computing platform;
      identify, based on a correlation included in the user information and to a user profile at a remote database, one or more changes to the user information;
      retrieve the one or more changes from the remote database;
      update, based on retrieving the one or more changes from the remote database, the distributed ledger, wherein updating the distributed ledger comprises adding or modifying an entry corresponding to the first user at the distributed ledger;
      receive, from a second user device, a request to access the user information corresponding to the first user;
      determine, based on one or more permissions included in the user information, whether the second user device has access to the user information;
      send, based on determining the second user device has access to the user information, an authorized access alert to the first user device;
      establish, based on receiving, from the first user device, approval information confirming access to the user information, a secure channel between the first user device and the second user device via the computing platform;
      process, based on communications sent via the secure channel, one or more secure requests associated with a venture corresponding to both the first user device and to the second user device;
      detect, while processing, a permission violation;
      initiate, based on the permission violation, one or more security actions;
      receive, from the first user device, an updated cyber contract corresponding to the user information; and
      update, based on the updated cyber contract, one or more permissions associated with accessing the user information.

2. The computing platform of claim 1, wherein the memory stores additional instructions that, when executed by the at least one processor, cause the computing platform to:
   train a response model based on historical cyber contracts associated with the first user, wherein training the response model configures the response model to output proposed security actions based on information indicating permission violations;
   generate, based on inputting information of the detected permission violation into the response model, one or more proposed security actions,
   wherein the one or more security actions initiated by the computing platform include at least one of the one or more proposed security actions;

receive, from the first user device and based on initiating the one or more security actions, one or more updated cyber contracts; and update, based on one or more updated cyber contracts, the response model.

3. The computing platform of claim 1, wherein processing the one or more secure requests comprises:
  receiving, from the first user device, an incident report comprising information corresponding to one or more of:
    a financial event impacting the venture corresponding to both the first user device and to the second user device,
    an environmental event impacting the venture corresponding to both the first user device and to the second user device,
    a risk event impacting the venture corresponding to both the first user device and to the second user device, or
    a regulatory event impacting the venture corresponding to both the first user device and to the second user device;
  providing the incident report to the second user device via the secure channel;
  causing, based on providing the incident report to the second user device, the second user device to initiate one or more response actions; and
  updating, based on the one or more response actions, the incident report, wherein updating the incident report comprises adding or modifying an entry corresponding to the incident report at the distributed ledger.

4. The computing platform of claim 1, wherein processing the one or more secure requests comprises:
  receiving an interaction opportunity from the first user device, wherein the interaction opportunity comprises one or more of:
    an employment opportunity,
    a request to communicate with a user associated with the venture corresponding to both the first user device and to the second user device, or
    an invitation to collaborate on a project associated with the venture corresponding to both the first user device and to the second user device;
  providing the interaction opportunity to the second user device via the secure channel;
  receiving, based on providing the interaction opportunity to the second user device and from the second user device, a response to the interaction opportunity;
  providing, to the first user device, the response to the interaction opportunity; and
  hosting, based on the response to the interaction opportunity and via the secure channel, a discussion between the first user and a second user of the second user device.

5. The computing platform of claim 1, wherein the one or more security actions comprise one or more of:
  terminating the secure channel,
  filtering one or more messages sent via the secure channel,
  denying the second user device access to a requested portion of the user information, or
  storing a record of the permission violation, wherein storing the record of the permission violation comprises modifying or adding an entry to the distributed ledger, wherein the entry comprises an indication of the permission violation and a corresponding indication of the second user device.

6. The computing platform of claim 1, wherein the one or more permissions comprise one or more rules included in a cyber contract associated with the first user.

7. The computing platform of claim 1, wherein the one or more permissions comprise a private/public key pair.

8. The computing platform of claim 1, wherein determining whether the second user device has access to the user information comprises:
  notifying, based on receiving the request to access the user information, the first user device of an access attempt, wherein the notifying comprises sending an indication of the second user device and an indication of a requested portion of the user information;
  requesting, from the first user device and based on notifying the first user device of the access attempt, biometric information of the first user;
  receiving, from the first user device, the biometric information of the first user; and
  granting, based on receiving the biometric information of the first user, the second user device access to the user information.

9. A method comprising:
  at a computing device comprising at least one processor, a communication interface, and memory:
    receiving, from a first user device, user information corresponding to a first user;
    storing the user information at a distributed ledger maintained by the computing device;
    identifying, based on a correlation included in the user information and to a user profile at a remote database, one or more changes to the user information;
    retrieving the one or more changes from the remote database;
    updating, based on retrieving the one or more changes from the remote database, the distributed ledger, wherein updating the distributed ledger comprises adding or modifying an entry corresponding to the first user at the distributed ledger;
    receiving, from a second user device, a request to access the user information corresponding to the first user;
    determining, based on one or more permissions included in the user information, whether the second user device has access to the user information;
    sending, based on determining the second user device has access to the user information, an authorized access alert to the first user device;
    establishing, based on receiving, from the first user device, approval information confirming access to the user information, a secure channel between the first user device and the second user device via the computing device;
    processing, based on communications sent via the secure channel, one or more secure requests associated with a venture corresponding to both the first user device and to the second user device;
    detecting, while processing, a permission violation;
    initiating, based on the permission violation, one or more security actions;
    receiving, from the first user device, an updated cyber contract corresponding to the user information; and
    update, based on the updated cyber contract, one or more permissions associated with accessing the user information.

10. The method of claim 9, further comprising:
  training a response model based on historical cyber contracts associated with the first user, wherein training the response model configures the response model to output proposed security actions based on information indicating permission violations;
generating, based on inputting information of the detected permission violation into the response model, one or more proposed security actions,
wherein the one or more security actions initiated by the computing device include at least one of the one or more proposed security actions;
receiving, from the first user device and based on initiating the one or more security actions, one or more updated cyber contracts; and
updating, based on one or more updated cyber contracts, the response model.

11. The method of claim 9, wherein the one or more security actions comprise one or more of:
terminating the secure channel,
filtering one or more messages sent via the secure channel,
denying the second user device access to a requested portion of the user information, or
storing a record of the permission violation, wherein storing the record of the permission violation comprises modifying or adding an entry to the distributed ledger, wherein the entry comprises an indication of the permission violation and a corresponding indication of the second user device.

12. The method of claim 9, wherein determining whether the second user device has access to the user information comprises:
notifying, based on receiving the request to access the user information, the first user device of an access attempt, wherein the notifying comprises sending an indication of the second user device and an indication of a requested portion of the user information;
requesting, from the first user device and based on notifying the first user device of the access attempt, biometric information of the first user;
receiving, from the first user device, the biometric information of the first user; and
granting, based on receiving the biometric information of the first user, the second user device access to the user information.

13. The method of claim 9, wherein the one or more permissions comprise one or more rules included in a cyber contract associated with the first user.

14. The method of claim 9, wherein the one or more permissions comprise a private/public key pair.

15. One or more non-transitory computer-readable media storing instructions that, when executed by a computing platform comprising at least one processor, a communication interface, and memory, cause the computing platform to:
receive, from a first user device, user information corresponding to a first user;
store the user information at a distributed ledger maintained by the computing platform;
identify, based on a correlation included in the user information and to a user profile at a remote database, one or more changes to the user information;
retrieve the one or more changes from the remote database;
update, based on retrieving the one or more changes from the remote database, the distributed ledger, wherein updating the distributed ledger comprises adding or modifying an entry corresponding to the first user at the distributed ledger;
receive, from a second user device, a request to access the user information corresponding to the first user;
determine, based on one or more permissions included in the user information, whether the second user device has access to the user information;
send, based on determining the second user device has access to the user information, an authorized access alert to the first user device;
establish, based on receiving, from the first user device, approval information confirming access to the user information, a secure channel between the first user device and the second user device via the computing platform;
process, based on communications sent via the secure channel, one or more secure requests associated with a venture corresponding to both the first user device and to the second user device;
detect, while processing, a permission violation;
initiate, based on the permission violation, one or more security actions;
receive, from the first user device, an updated cyber contract corresponding to the user information; and
update, based on the updated cyber contract, one or more permissions associated with accessing the user information.

16. The one or more non-transitory computer-readable media of claim 15 storing instructions that, when executed, further cause the computing platform to:
train a response model based on historical cyber contracts associated with the first user, wherein training the response model configures the response model to output proposed security actions based on information indicating permission violations;
generate, based on inputting information of the detected permission violation into the response model, one or more proposed security actions,
wherein the one or more security actions initiated by the computing platform include at least one of the one or more proposed security actions;
receive, from the first user device and based on initiating the one or more security actions, one or more updated cyber contracts; and
update, based on one or more updated cyber contracts, the response model.

17. The one or more non-transitory computer-readable media of claim 15, wherein the one or more security actions comprise one or more of:
terminating the secure channel,
filtering one or more messages sent via the secure channel,
denying the second user device access to a requested portion of the user information, or
storing a record of the permission violation, wherein storing the record of the permission violation comprises modifying or adding an entry to the distributed ledger, wherein the entry comprises an indication of the permission violation and a corresponding indication of the second user device.

18. The one or more non-transitory computer-readable media of claim 15, wherein determining whether the second user device has access to the user information comprises:
notifying, based on receiving the request to access the user information, the first user device of an access attempt, wherein the notifying comprises sending an indication of the second user device and an indication of a requested portion of the user information;

requesting, from the first user device and based on notifying the first user device of the access attempt, biometric information of the first user;

receiving, from the first user device, the biometric information of the first user; and granting, based on receiving the biometric information of the first user, the second user device access to the user information.

19. The one or more non-transitory computer-readable media of claim 15, wherein the one or more permissions comprise one or more rules included in a cyber contract associated with the first user.

20. The one or more non-transitory computer-readable media of claim 15, wherein the one or more permissions comprise a private/public key pair.

* * * * *